United States Patent
Takeuchi et al.

(10) Patent No.: US 9,501,196 B2
(45) Date of Patent: Nov. 22, 2016

(54) DISPLAY APPARATUS AND TOUCH DETECTION APPARATUS USING SHIFT OF DETECTION OPERATION FOR REDUCED DETECTION TIME

(71) Applicant: JAPAN DISPLAY, INC., Tokyo (JP)

(72) Inventors: Takeya Takeuchi, Aichi (JP); Koji Noguchi, Kanagawa (JP); Koji Ishizaki, Aichi (JP); Yasuyuki Teranishi, Aichi (JP); Takayuki Nakanishi, Aichi (JP)

(73) Assignee: Japan Display, Inc., Tokyo (JP)

( * ) Notice: Subject to any disclaimer, the term of this patent is extended or adjusted under 35 U.S.C. 154(b) by 0 days.

(21) Appl. No.: 15/068,614

(22) Filed: Mar. 13, 2016

(65) Prior Publication Data

US 2016/0195960 A1 Jul. 7, 2016

Related U.S. Application Data

(63) Continuation of application No. 12/776,233, filed on May 7, 2010, now Pat. No. 9,298,294.

(30) Foreign Application Priority Data

May 19, 2009 (JP) .................................. 2009-120614
Mar. 18, 2010 (JP) .................................. 2010-063024

(51) Int. Cl.
| G06F 3/044 | (2006.01) |
| G06F 3/041 | (2006.01) |
| G09G 3/36 | (2006.01) |

(52) U.S. Cl.
CPC ............. *G06F 3/044* (2013.01); *G06F 3/0412* (2013.01); *G09G 3/3655* (2013.01); *G09G 3/3677* (2013.01); *G09G 3/3614* (2013.01); *G09G 2300/0434* (2013.01)

(58) Field of Classification Search
None
See application file for complete search history.

(56) References Cited

U.S. PATENT DOCUMENTS 5,194,852 A * 3/1993 More .................. G06F 3/04883
178/18.03
2006/0192766 A1 8/2006 Nakamura et al.
(Continued)

FOREIGN PATENT DOCUMENTS

| JP | 08-297267 | 11/1996 |
| JP | 11-305932 | 11/1999 |

(Continued)

OTHER PUBLICATIONS

Hayashi et al., "Optical Sensor Embedded Input Display Usable Under High-Ambient-Light Conditions", SID 07Digest, pp. 1105-1108.
Youe et al., "12.1-inch a-Si:H TFT LCD with Embedded Touch Screen Panel", SID 08 Digest pp. 830-833.
(Continued)

*Primary Examiner* — Quan-Zhen Wang
*Assistant Examiner* — David Lee
(74) *Attorney, Agent, or Firm* — The Chicago Technology Law Group

(57) ABSTRACT

A display apparatus includes: a display face; a display function layer adapted to vary display on the display face in response to an inputted image signal; a plurality of driving electrodes disposed separately in one direction; a detection scanning control section configured to apply a detection driving voltage to some of the plural driving electrodes and carry out detection driving scanning while shifting an application object of the detection driving voltage in the one direction on the display face and then control the detection driving scanning such that jump shift of carrying out shift with a pitch of twice or more times a driving electrode pitch is included; and a plurality of sensor lines disposed separately in a direction different from the one direction and responding to touch or proximity of a detection object with or to the display face to exhibit an electric variation.

17 Claims, 20 Drawing Sheets

(56) References Cited

U.S. PATENT DOCUMENTS

| | | | |
|---|---|---|---|
| 2006/0238518 A1* | 10/2006 | Westerman | G06F 3/0235 345/173 |
| 2007/0229468 A1* | 10/2007 | Peng | G06F 3/044 345/173 |
| 2008/0062140 A1* | 3/2008 | Hotelling | G09G 3/3648 345/173 |
| 2008/0162997 A1* | 7/2008 | Vu | G06F 3/03545 714/27 |
| 2008/0192018 A1* | 8/2008 | Park | G06F 3/0412 345/173 |
| 2010/0194697 A1* | 8/2010 | Hotelling | G06F 3/0412 345/173 |

FOREIGN PATENT DOCUMENTS

| | | |
|---|---|---|
| JP | 2000-148376 | 5/2000 |
| JP | 2003-280759 | 10/2003 |
| JP | 2004-318819 | 11/2004 |
| JP | 2008-009750 | 1/2008 |
| KR | 10-2006-0017750 A | 2/2006 |
| KR | 10-2008-0075611 A | 8/2008 |

OTHER PUBLICATIONS

Lee et al., "Hybrid Touch Screen Panel Integrated in TFT-LCD", SID 08 Digest pp. 1101-1104.

* cited by examiner

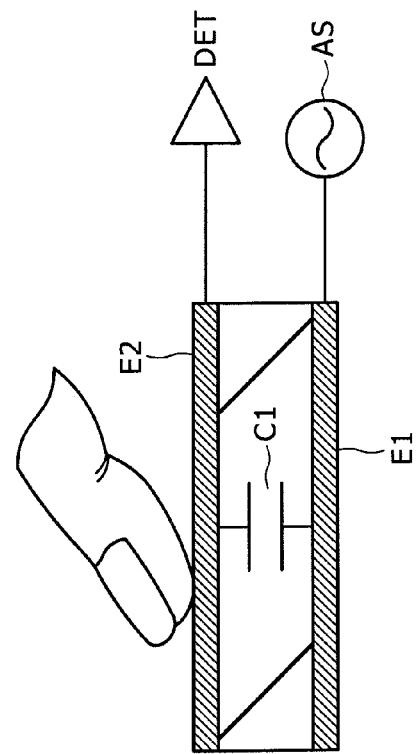
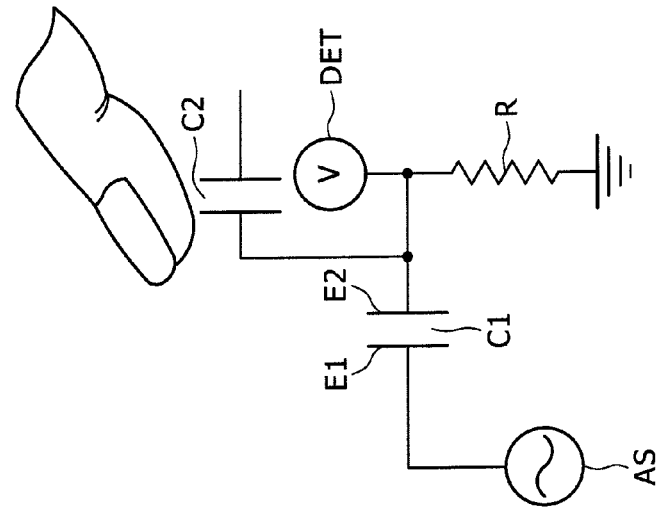
FIG. 2A
FIG. 2B

FIG.3A Vdet
FIG.3B Sg
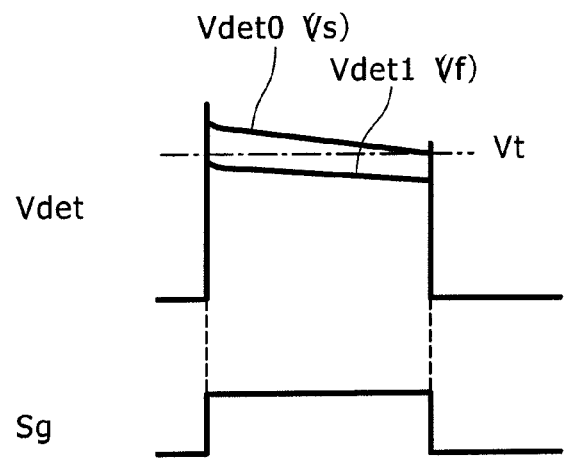
FIG.3C
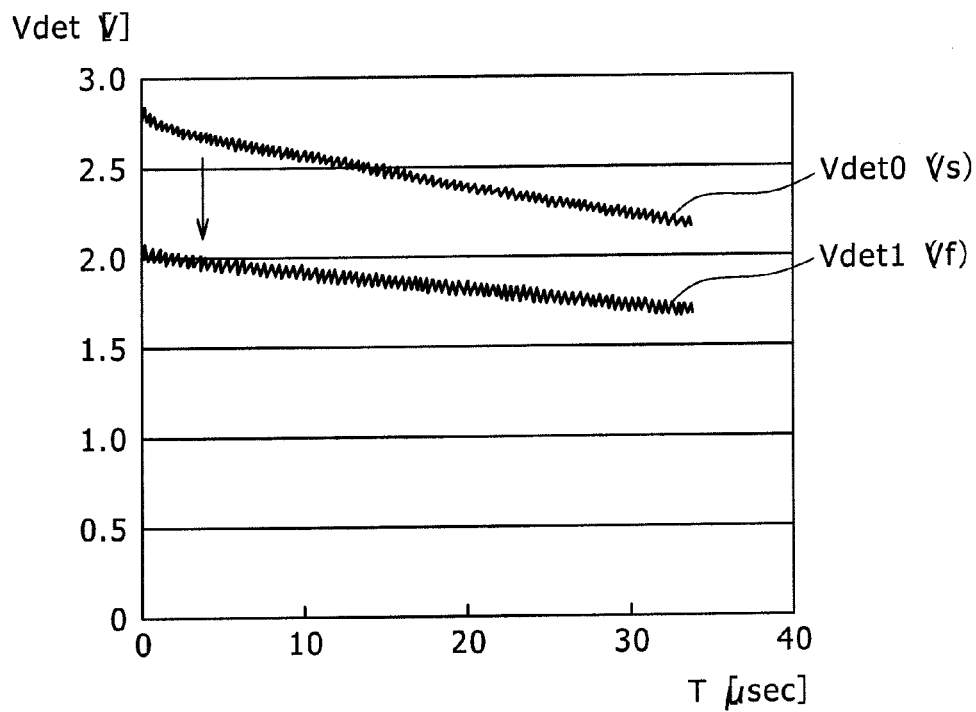

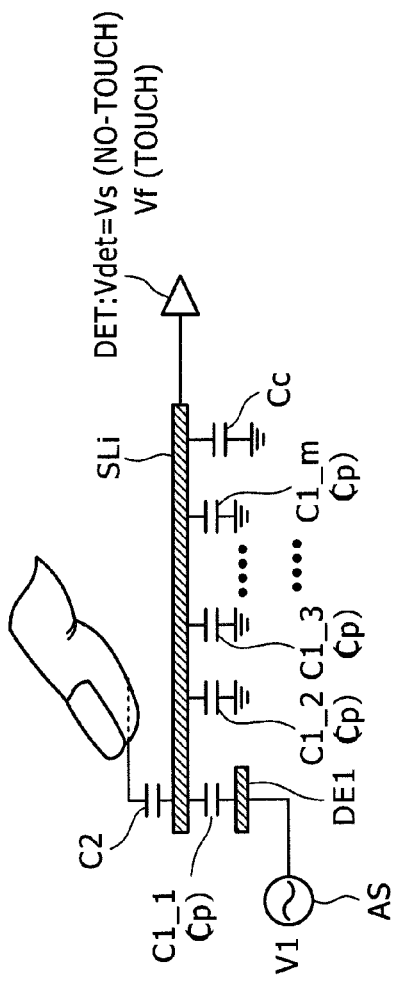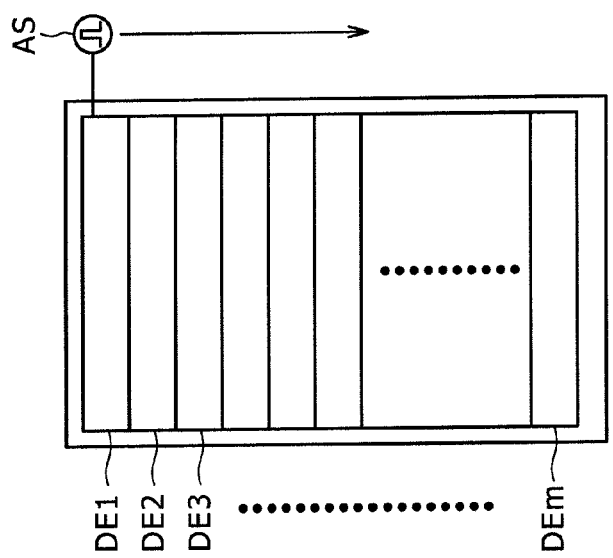

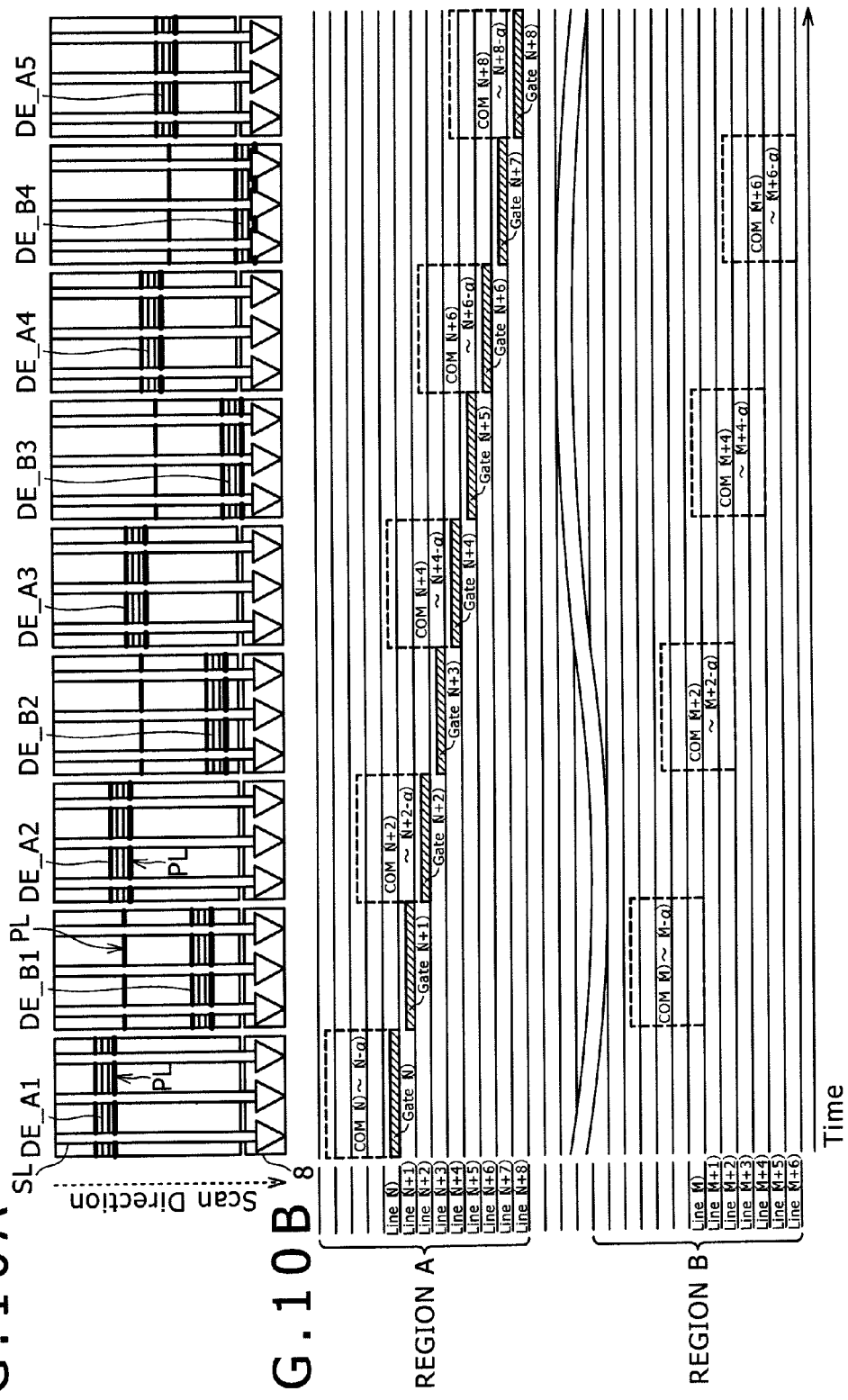

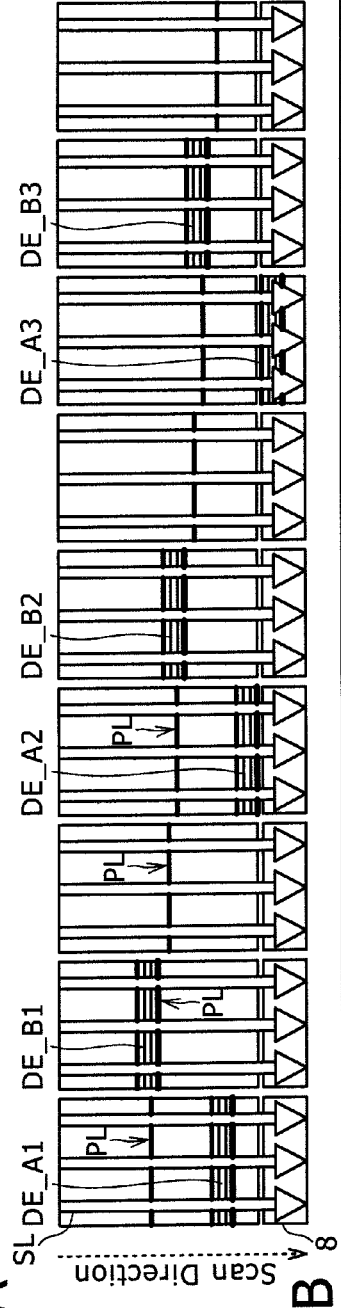
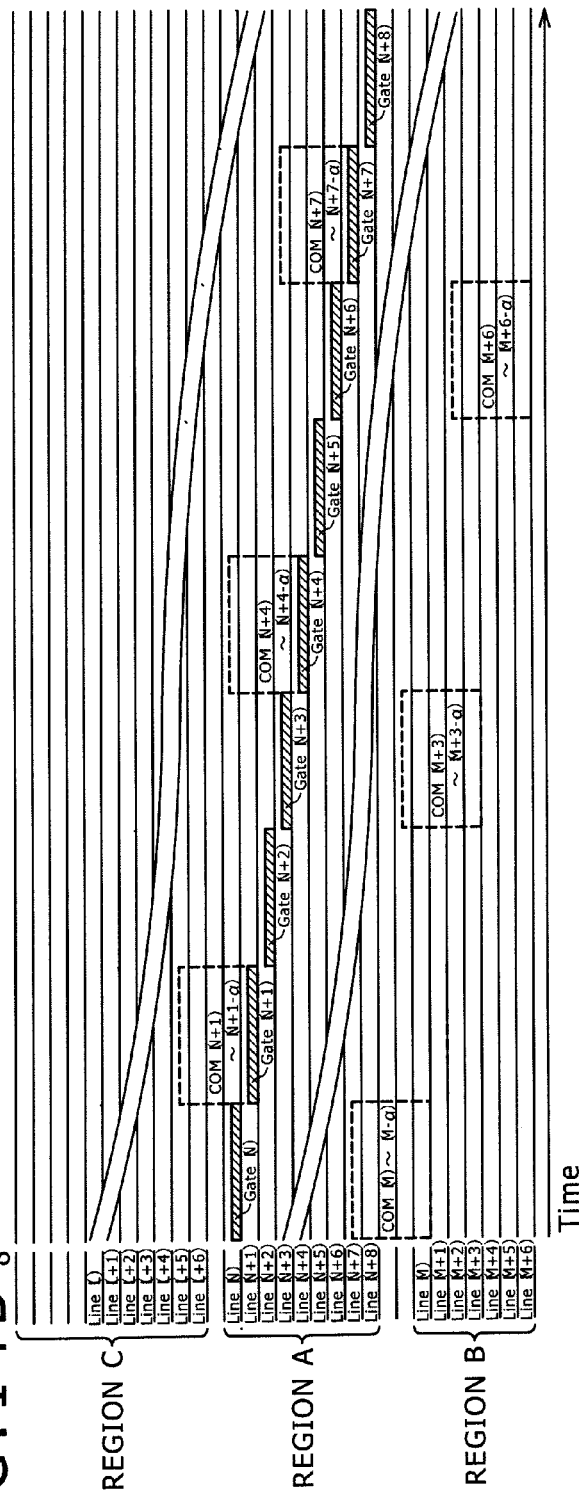
FIG. 14A
FIG. 14B

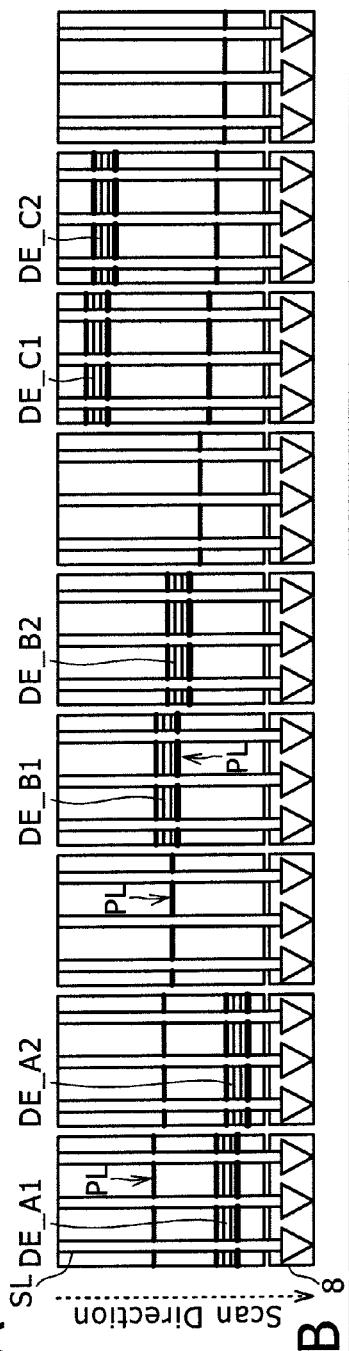
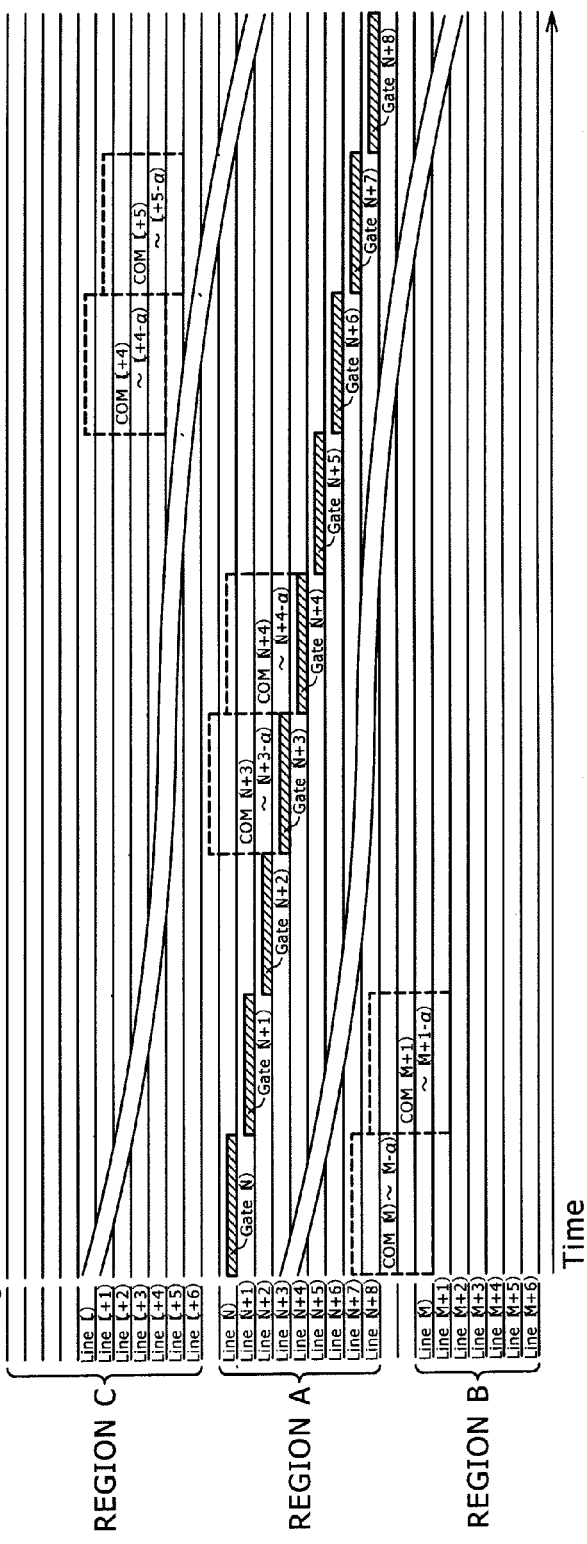
FIG. 15A
FIG. 15B

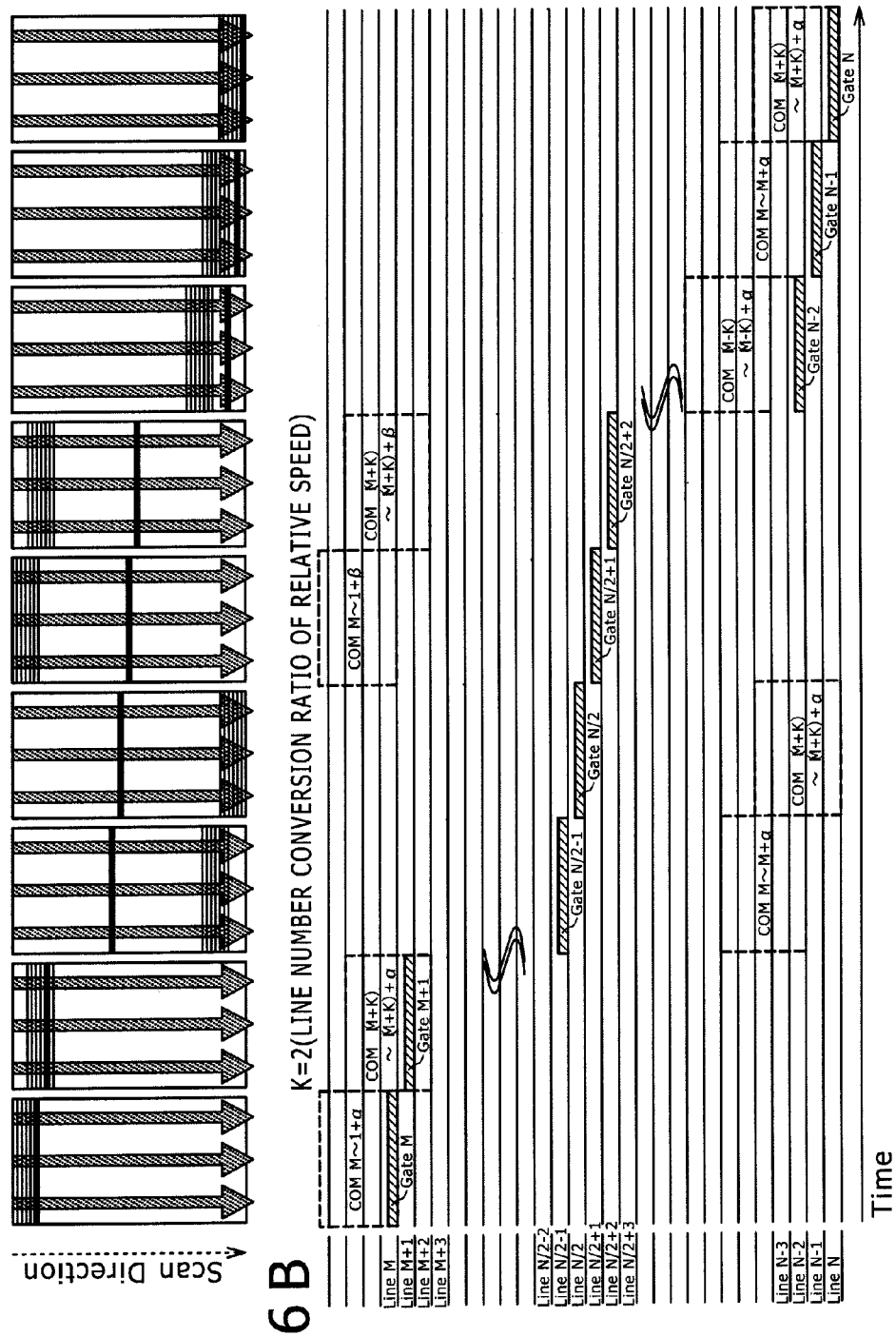

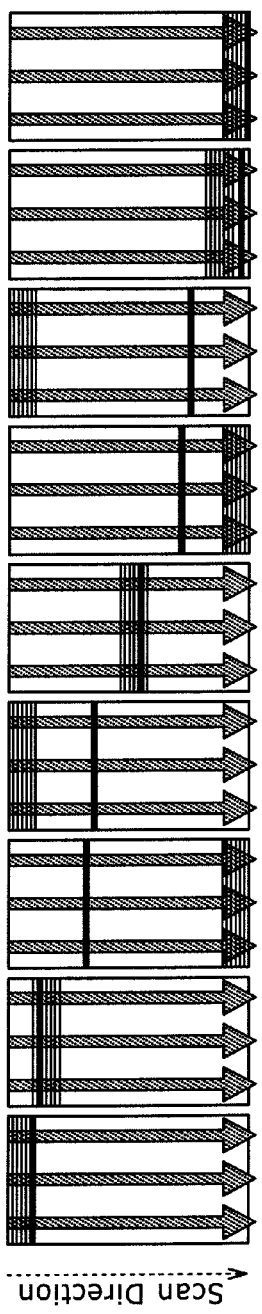
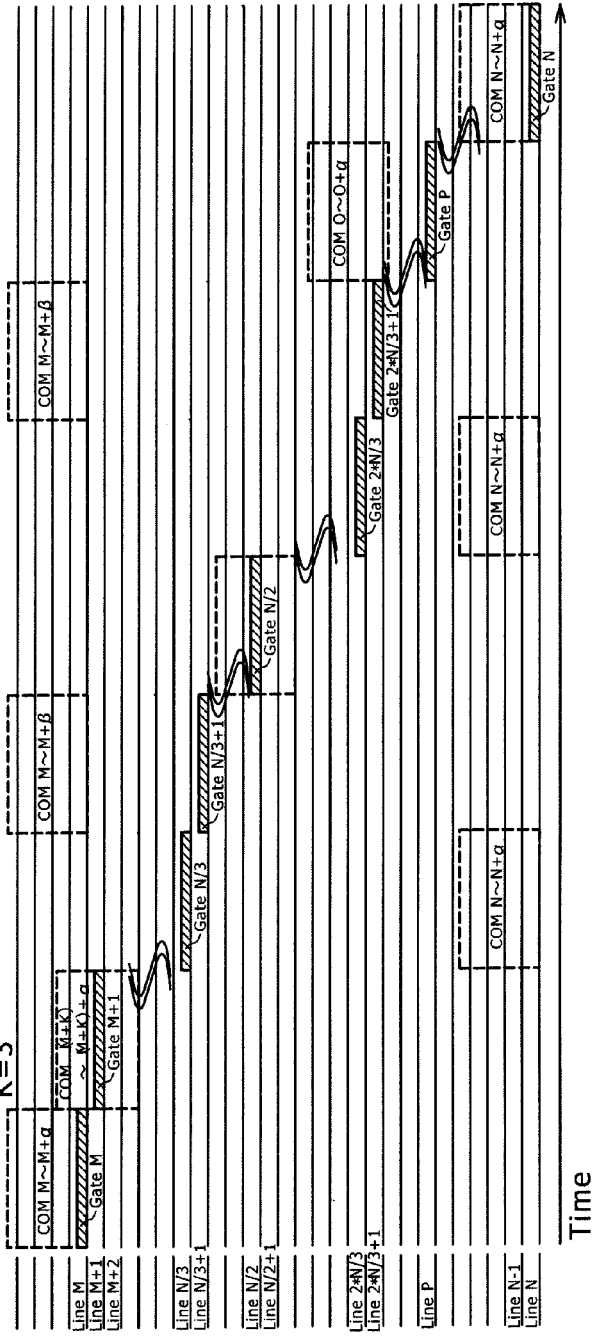
FIG. 17A
FIG. 17B

DISPLAY APPARATUS AND TOUCH DETECTION APPARATUS USING SHIFT OF DETECTION OPERATION FOR REDUCED DETECTION TIME

The subject matter of application Ser. No. 12/776,233 is incorporated herein by reference. The present application is a Continuation of U.S. Ser. No. 12/776,233, filed May 7, 2010, now U.S. Pat. No. 9,298,294, issued Mar. 29, 2016, which claims priority to Japanese Patent Application JP 2009-120614 filed on May 19, 2009, and Japanese Priority Patent Application JP 2010-063024 filed in the Japanese Patent Office on Mar. 18, 2010, the entire contents of which are hereby incorporated by reference.

BACKGROUND OF THE INVENTION

1. Field of the Invention

The present invention relates to a display apparatus having a function for detecting touch or proximity of a finger, a pen or the like with or to a detection face by the user, that is, a function of touch detection such as a touch panel or a like apparatus. The present invention further relates to a touch detection apparatus having the touch detection function.

2. Description of the Related Art

For a touch detection method for a touch panel, three types including an optical type, a resistance film type and a capacitance type are known.

Meanwhile, in order to associate electrical variation occurring in response to touch or proximity with position information, a great number of wiring lines combined so as to be capable of achieving position specification and arranged in a matrix are required. According to a method of position detection which depends upon a combination of wiring lines, a great number of wiring lines are required to increase the resolution of the detection.

Therefore, in the three detection methods, a driving method for detecting a touch position or a proximity position while a line from which an electric variation is to be outputted is scanned in one direction is becoming the mainstream. For example, a driving method of the optical type is disclosed in Hirotaka Hayashi etc. "Optical Sensor Embedded Input Display Usable under High-Ambient-Light Conditions," SID 07 DIGEST, p. 1105 (hereinafter referred to as Non-Patent Document 1). Meanwhile, a driving method of the resistance film type is disclosed in Bong Hyun You etc., "12.1-inch a-Si:H TFT LCD with Embedded Touch Screen Panel," SID 08 DIGEST p. 830 (hereinafter referred to as Non-Patent Document 2). Further, a driving method of the capacitance type is disclosed in Joohyung Lee etc., "Hybrid Touch Screen Panel Integrated in TFT-LCD," SID 08 DIGEST p. 834 (hereinafter referred to as Non-Patent Document 3). Here, the term "line" signifies an array in an X direction or a Y direction of fine sensor sections arranged two-dimensionally in accordance with a predetermined rule for touch detection.

Incidentally, if a touch panel is provided in an overlapping relationship on a display panel, then the thickness of the overall displaying module increases. Further, a retaining member for retaining the touch panel on the display panel is required, and the area of a frame (portion around an effective detection face) increases and the cost increases.

Therefore, in recent years, the mainstream of the type to be developed has changed from a type wherein a touch panel is mounted in an overlapping relationship on a display panel to another type wherein a touch panel is built in a display panel (refer to Non-Patent Documents 1 to 3 and Japanese Patent Laid-Open No. 2008-9750 (hereinafter referred to as Patent Document 1)).

In the following description, "display apparatus with touch sensor" is used as a denomination of an apparatus which has any form of incorporation of a touch panel in regard to whether the touch panel is mounted in an overlapping relationship on a display panel or is formed integrally with a display panel.

SUMMARY OF THE INVENTION

A user of a touch panel sometimes feels delay after the user touches a detection face until the touch is detected. If the delay is long, then this degrades the operability. Further, depending upon application software, it is required to minimize the delay. The delay time after an execution instruction is issued until execution of the instruction is completed is called latency, and in order to improve the operability, improvement in regard to the latency is required.

Therefore, as a driving method for achieving improvement in regard to the latency, it seems a possible idea that, where a touch detection apparatus is driven for each line, lines along one or both of a Y-axial direction and an X-axial direction are voltage-driven or detection-scanned successively at a high speed.

However, if the driving frequency or the like upon detection scanning is increased to raise the speed of the detection scanning in the touch detection apparatus, then power consumption increases. Further, if the driving frequency or the like upon detection scanning is increased where the time constant of a wiring line or the like is high, then the amplitude of a detection signal decreases and the detection accuracy sometimes degrades.

The present invention provides a display apparatus having a function of touch detection wherein the latency is reduced and the responsibility is improved without increasing the detection driving frequency. Further, the present invention provides a touch detection apparatus having a function of the touch detection.

According to an embodiment of the present invention, there is provided a display apparatus including: a display face; a display function layer adapted to vary display on the display face in response to an inputted image signal; a plurality of driving electrodes disposed separately in one direction; a detection scanning control section configured to apply a detection driving voltage to some of the plural driving electrodes and carry out detection driving scanning while shifting an application object of the detection driving voltage in the one direction on the display face and then control the detection driving scanning such that jump shift of carrying out shift with a pitch of twice or more times a driving electrode pitch is included; and a plurality of sensor lines disposed separately in a direction different from the one direction and responding to touch or proximity of a detection object with or to the display face to exhibit an electric variation.

In the display apparatus, in the detection driving scanning which is executed and controlled by the detection scanning control section, the shift which is repeated by a plural number of times within a scanning period of the display face includes the jump shift. Therefore, as the frequency of the jump shift increases, the time before touch is detected first on the display face within the period of detection scanning becomes short. It is to be noted that, where the term "touch detection" is used herein, not only it is detected that a detection object touches with the display face but also it is detected that a detection object is positioned in the proximity of the display face.

Where sequential scanning from one side to the other side of the plural driving electrodes in the separation direction, that is, in the one direction without applying the present invention, that is, without involving the jump shift, the response of touch detection where a detection object exists on the far side from the scanning start point is later than the response of touch detection where a detection object exists on the near side to the scanning start point.

In contrast, with the display apparatus according to the embodiment of the present invention, touch detection in the detection face can be carried out roughly only by repeating the jump shift several times. Therefore, where it is desired to detect presence or absence of a detection object rapidly, even if the frequency of the detection driving scanning is equal, the interval until touch is detected first is shortened by such jump shift.

According to another embodiment of the present invention, there is provided a touch detection apparatus including: a detection face; a plurality of driving electrodes disposed separately in one direction; a detection scanning control section configured to apply a detection driving voltage to some of the plural driving electrodes and carry out detection driving scanning while shifting an application object of the detection driving voltage in the one direction on the detection face and then control the detection driving scanning such that jump shift of carrying out shift with a pitch of twice or more times a driving electrode pitch is included; and a plurality of sensor lines disposed separately in a direction different from the one direction and adapted to exhibit, if a detection object is brought into touch with or proximity to the detection face while the detection driving scanning is being carried out by the detection scanning control section, electric variation in response to the touch or the proximity.

Different from the display apparatus described above, the touch detection apparatus does not have the display function layer.

Where the touch detection apparatus is applied to a liquid crystal display apparatus, a liquid crystal layer corresponds to the display function layer described above. Further, where the touch detection apparatus is applied to a liquid crystal display apparatus or a like display apparatus, two electrodes such as a pixel electrode and a driving electrode for applying a display voltage to each pixel of the display function layer, that is, the liquid crystal layer, may be disposed such that they sandwich the liquid crystal therebetween or may be disposed on the side remote from the display face.

For example, in order to reduce the thickness of the entire display apparatus, the plural driving electrodes for the detection driving scanning preferably serve also as display driving electrodes for display driving scanning.

In this instance, in the liquid crystal display apparatus, the detection scanning control section and the display scanning control section may be formed as separate circuits from each other or may be formed as a single circuit.

In summary, with the display apparatus and the touch detection apparatus, the latency can be reduced to improve the responsibility without raising the detection driving frequency.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 2A and 2B are an equivalent circuit diagram and a schematic sectional view, respectively, where a finger is in touch with or proximate to the touch sensor section shown in FIGS. 1A and 1B;

FIGS. 3A to 3C are diagrams illustrating input and output waveforms of the touch sensor section according to the first and second embodiments;

FIGS. 5A to 5C are a top plan view, an equivalent circuit diagram and an expression, respectively, illustrating touch sensor detection according to the first embodiment;

FIGS. 10A and 10B are diagrammatic views of a first example of shift operation;

FIGS. 14A and 14B are diagrammatic views of a fifth example of shift operation;

FIGS. 15A and 15B are diagrammatic views of a sixth example of shift operation;

FIGS. 16A and 16B are diagrammatic views of a seventh example of shift operation;

FIGS. 17A and 17B are diagrammatic views of an eighth example of shift operation;

DETAILED DESCRIPTION OF THE PREFERRED EMBODIMENTS

In the following, embodiments of the present invention are described taking a capacitance type touch detection apparatus and a liquid crystal display apparatus having a function for touch detection as principal examples with reference to the drawings. It is to be noted that the present invention can be applied also to a resistance film type apparatus and an optical type apparatus. Further, while a liquid crystal display apparatus is taken as an example here, the present invention can be applied also to a different display apparatus such as an organic EL display apparatus or the like.

Description is given in the following order.
1. First Embodiment: Touch Detection Apparatus
2. Second Embodiment: Liquid Crystal Display Apparatus
3. Modifications
4. Applications to Electronic Apparatus <1. First Embodiment>
Basic Configuration and Operation of Touch Detection First, as a matter which is a prerequisite to the first embodiment but is common to the other embodiment, a basis of capacitance type touch detection is described with reference to FIGS. 1A to 3C.

Figure 1A:
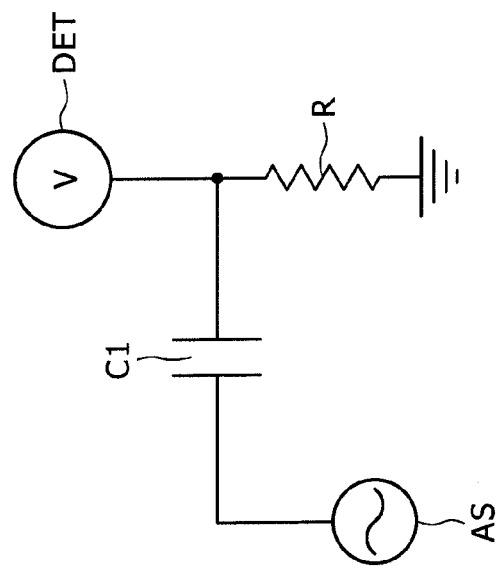
FIGS. 1A and 1B are an equivalent circuit diagram and a schematic sectional view, respectively, illustrating operation of a touch sensor section according to first and second embodiments.
Figure 1B:
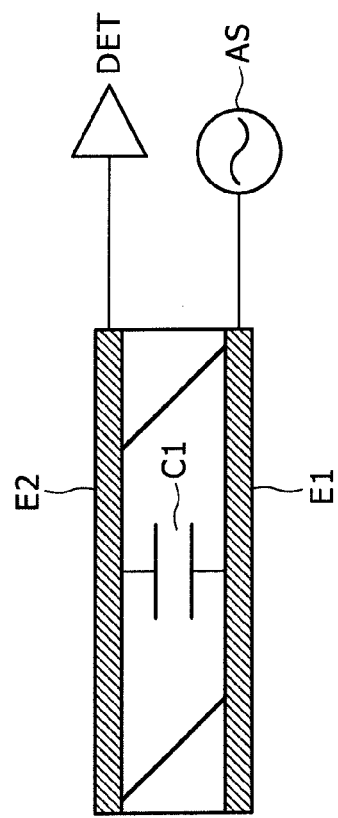

FIGS. 1A and 2A are equivalent circuit diagrams of a touch sensor section and FIGS. 1B and 2B are structure views (schematic sectional views) of the touch sensor section. Here, FIGS. 1A and 1B show a case wherein a finger as a detection target is not proximate to a sensor and FIGS. 2A and 2B show another case wherein the finger touches with or approaches the sensor.

The touch sensor section shown in FIGS. 1A and 2A is a capacitance type touch sensor and is formed from a capacitance element as shown in FIGS. 1B and 2B. In particular, a capacitance element (capacitance) C1 is formed from a dielectric D and a pair of electrodes disposed in an opposing relationship in such a manner as to sandwich the dielectric D therebetween, that is, a driving electrode E1 and a detection electrode E2.

As shown in FIGS. 1A and 2A, the driving electrode E1 of the capacitance element C1 is connected to an AC signal source AS for generating an AC pulse signal Sg. The detection electrode E2 of the capacitance element C1 is connected to a detection circuit DET. The detection electrode E2 is grounded through a resister R so that the DC level is electrically fixed. It is to be noted that such grounding through the resister is not essentially required, and, for example, through a logic circuit, the detection electrode E2 may be fixed to the GND potential or a different potential within a certain period and may be in a floating state within another certain period.

An AC pulse signal Sg having a predetermined frequency, for example, an approximately several [kHz] to several tens [kHz], is applied from the AC signal source AS to the driving electrode E1.

A waveform diagram of the AC pulse signal Sg is shown in FIG. 3B. A signal having an output waveform shown in FIG. 3A, that is, a detection signal Vdet, appears on the detection electrode E2 in response to application of the AC pulse signal Sg.

It is to be noted that, while details are described in connection with the second embodiment of the present invention hereinafter described, in the liquid crystal display apparatus which has a function of a touch detection apparatus in a liquid crystal display panel therein, a driving electrode E1 corresponds to an opposing electrode for liquid crystal driving, that is, to an electrode which is disposed in an opposing relationship and commonly to a plurality of pixels. Here, since the opposing electrode undergoes AC driving called Vcom driving in order to drive the liquid crystal. Therefore, in the second embodiment hereinafter described, a common driving signal for the Vcom driving is used also as an AC pulse signal Sg for driving the driving electrode E1 for a touch sensor.

In a state illustrated in FIGS. 1A and 1B wherein a finger does not touch the touch detection apparatus, the driving electrode E1 of the capacitance element C1 is AC driven, and an AC detection signal Vdet appears on the detection electrode E2 in response to charging and discharging of the capacitance element C1. The detection signal at this time is hereinafter referred to as "initial detection signal Vdet0." Since the detection electrode E2 side is not grounded in a high frequency although it is DC grounded, it does not have an AC discharging path and the pulse peak value of the initial detection signal Vdet0 is comparatively high. However, if time passes after the AC pulse signal Sg rises, then the pulse peak value of the initial detection signal Vdet0 gradually drops due to loss.

FIG. 3C illustrates a waveform in an enlarged scale together with a scale. Referring to FIG. 3C, the pulse peak value of the initial detection signal Vdet0 exhibits a drop by approximately 0.5 V from its initial value of 2.8 V by lapse of a short period of time due to high frequency loss.

If, in this initial state, a finger is brought into touch with the detection electrode E2 or comes to a very short distance to the detection electrode E2 at which it has an influence on the detection electrode E2, then the circuit state varies to a state equivalent to that in a case wherein a capacitance element C2 is connected to the detection electrode E2 as seen in FIG. 2A. This is because the human body is equivalent in terms of a high frequency to a capacitor which is grounded on one side thereof.

In this touching state, a discharge path of an AC signal through the capacitance elements C1 and C2 is formed. Consequently, in response to charging and discharging of the capacitance elements C1 and C2, AC current I1 and I2 flows through the capacitance elements C1 and C2, respectively. Therefore, the initial detection signal Vdet0 is divided into values which depend upon the ratio of the capacitance elements C1 and C2 and so forth, and the pulse peak value drops.

A detection signal Vdet1 illustrated in FIGS. 3A and 3C appears with the detection electrode E2 when a finger touches the touch detection apparatus. From FIG. 3C, it can be recognized that the dropping amount of the detection signal is approximately 0.5 to 0.8 V. A detection circuit DET shown in FIGS. 1A to 2B detects the drop of the detection signal using, for example, a threshold value Vt to detect the touch of a finger.

General Configuration of the Touch Detection Apparatus

Figure 4A:
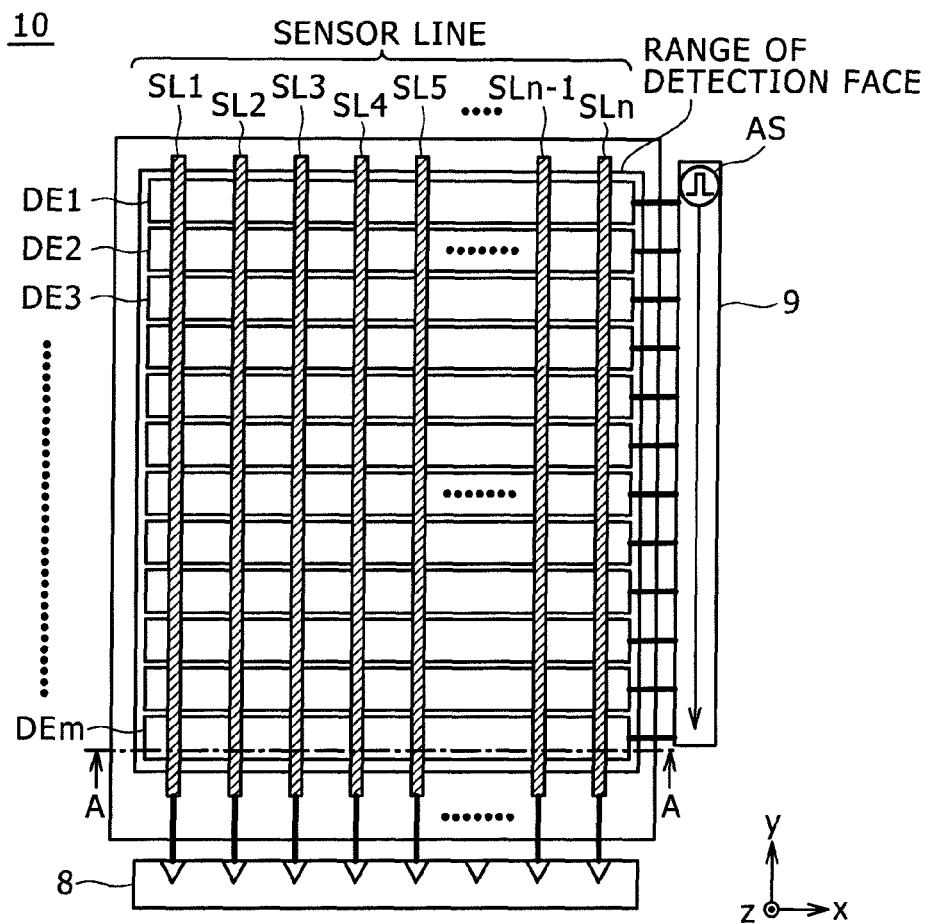
FIGS. 4A and 4B are a top plan view and a schematic sectional view, respectively, showing a configuration of a touch detection apparatus according to the first embodiment.

FIG. 4A shows a schematic plan view of the touch detection apparatus according an embodiment of the present invention. In the plan view, a protective layer of the outermost surface is omitted such that the inside of the apparatus is observed through a detection face, that is, the outermost face of the protective layer. Meanwhile, FIG. 4B shows a schematic sectional view taken along line A-A of FIG. 4A.

Figure 4B:
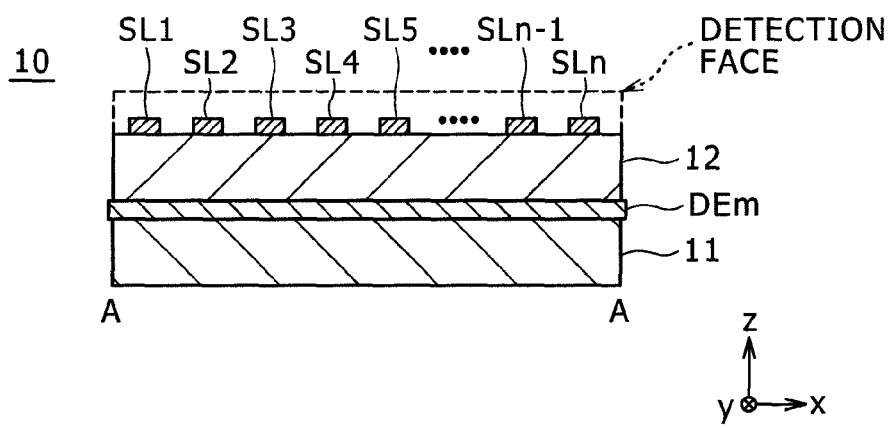

As seen in FIG. 4B, the touch detection apparatus 10 includes a first substrate 11, a second substrate 12, and a driving electrode DEm disposed between the first substrate 11 and the second substrate 12. The second substrate 12 has n sensor lines SL1 to SLn disposed on a face thereof remote from the driving electrode DEm, that is, on a face thereof on the detection face side.

The n sensor lines SL1 to SLn are formed as wiring lines elongated in a y direction as seen in FIG. 4A. An arbitrary one of the sensor lines SL1 to SLn is hereinafter referred to as sensor line SLi (i=1, 2, 3, . . . , n).

The number of such driving electrodes is m, and the m driving electrodes are formed as belts elongated in an x direction and disposed at an equal pitch in the y direction. The m driving electrodes DEj (j=1, 2, 3, . . . , m) are disposed in a direction different from that of the n sensor lines SL1 to SLn. In the present example, the driving electrodes DEj and the sensor lines SLi are disposed orthogonally to each other.

The material of the first substrate 11 and the second substrate 12 shown in FIG. 4B is not limited particularly. However, it is necessary for the sensor lines SLi of the n sensor lines SL1 to SLn to be capacitively coupled to individual ones DEj of the m driving electrodes DE1 to DEm. Therefore, the thickness and the material of the second substrate 12 are determined from a point of view that the capacitive coupling should have a predetermined strength. From this point of view, some insulator may be interposed between the n sensor lines SL1 to SLn and the m driving electrodes DE1 to DEm.

Referring to FIG. 4A, a scanning driving section 9 is disposed such that it is connected to one end of the m driving electrodes DE1 to DEm. Further, a touch detection section 8 is disposed such that it is connected to one end of the n sensor lines SL1 to SLn.

The scanning driving section 9 has an AC signal source AS for each driving electrode as seen in FIGS. 1A to 2B. The scanning driving section 9 changes over that one of the AC signal sources AS which is to be activated in a direction indicated by an arrow mark, that is, in a scanning direction, within the block of the scanning driving section 9 of FIG. 4A. Or, the scanning driving section 9 has a single AC signal source AS and changes over connection between the single AC signal source AS and one of the m driving electrodes DEj in the scanning direction.

The scanning driving section 9 corresponds to one example of a "detection scanning control section" which carries out detection driving scanning. The "detection driving scanning" here signifies operation of repeating application of a detection driving voltage such as, for example, an AC voltage and shifting the application object in one direction by a plural number of times within a scanning period within the detection face.

Generally, where the term "scanning" is used, it frequently signifies operation of changing over a driving electrode of a voltage application object to which a driving voltage, which is not limited to an AC voltage and a DC voltage, is to be actually applied successively from a one-end one to the other-end one of the m driving electrodes.

However, although, in the present invention, sequential scanning, which is scanning of changing over the driving electrode DE as a voltage application object from a start point to an end point of the arrow mark, is not always carried out, sequential scanning may be carried out partially. This is because a jump shift of shifting a voltage application object jumping over some driving electrodes DE is carried out midway. Further, the scanning driving section 9 sometimes carries out scanning different from the sequential scanning such as sequential scanning in the opposite direction to the direction of the arrow mark or scanning which includes a jump shift in the opposite direction to the direction of the arrow mark. It is to be noted that the direction indicated by the arrow mark in the scanning driving section 9 of FIG. 4A merely indicates a direction of basic scanning carried out by the scanning driving section 9.

From the foregoing, it can be considered that the scanning driving section 9, that is, the detection scanning control section, is a circuit which controls the shift of a voltage application object such that a jump shift of carrying out detection driving scanning in a pitch equal to twice or more of the pitch of the driving electrodes is included.

The scanning driving section 9 should be controlled in terms of its scanning algorithm, particularly in the manner of a shift, based on a control signal provided thereto from the outside such as, for example, a CPU (Central Processing Unit) or a pulse generation circuit not shown. A particular block configuration of the scanning driving section 9 is hereinafter described.

Further, as described in connection with modifications hereinafter described, the scanning algorithm may include an algorithm for voltage application such as control of the magnitude or phase of the voltage to be applied in addition to the manner of shift operation.

It is to be noted that, in the present embodiment, the orthogonal arrangement of the driving electrodes and the sensor lines is not essentially required, and if the capacitive coupling between the sensor lines and the driving electrodes is uniform or substantially uniform in the detection plane, then there is no necessity to particularly limiting the shape or arrangement of the sensor lines and the driving electrodes.

However, if the sensor lines are led out from one of two orthogonal sides of the detection face and connected to the touch detection section 8 while the driving electrodes are led out from the other one of the two sides and connected to the scanning driving section 9 as seen in FIG. 4A, then it is easy to arrange the touch detection section 8 and the scanning driving section 9. Therefore, although the orthogonal arrangement of the driving electrodes and the sensor lines is preferable, this is not essentially required.

Algorithm of Shift Operation

Here, an outline of a shift algorithm is described.

A shift executed by application of an embodiment of the present invention can be carried out roughly in two different manners including a manner wherein it is carried out at random and another manner wherein it is carried out regularly.

A random shift is executed such that the shift amount or the shift direction, that is, selection of a voltage application object, for a next shift is determined every time using, for example, a random number generated by the scanning driving section 9 itself or a random number supplied from the outside. The random shift "controls, where shift operation is to be carried out by an amount equal to P ($\geq 1$) times the driving electrode pitch, the value of P." Since the random shift is carried out at random, naturally it includes a jump shift at a high probability.

As a result where a random shift is carried out, the probability that sequential scanning may be carried out is minimized but is not zero. Particularly where only several driving electrodes DE are involved, such a probability that jump scanning is not carried out at all cannot be ignored.

However, since usually the number m of driving electrodes DE is as great as several hundreds, where a random shift is carried out, the probability that jump scanning may not be carried out at all within a scanning period of time of one screen may be regarded as being zero. Conversely speaking, where a random shift is carried out, it is necessary for the number m of driving electrodes DE to be so great that a jump shift is included one time or more within a scanning period of time of one screen. Here, the "scanning period of time of one screen" is a period of time, in the case of sequential scanning, from the start of driving of the first driving electrode DE1 to the end of the driving of the last driving electrode DEm.

On the other hand, in regard to a periodical shift, the algorithm therefor should be determined such that a jump shift is included one time or more within a scanning period of time of one screen. However, since the object of a jump shift is to recognize touch detection as early as possible, it is necessary to set the shift value of a jump shift, that is, the driving electrode pitch P upon a jump shift, to a somewhat high value. To this end, regular shift operation preferably is shift operation which is carried out, when one screen is partitioned into F (≥2) regions in the y direction, as uniformly as possible between the regions. At this time, preferably the shift operation is carried out for movement of a driving object between the regions.

Or, a jump shift is preferably carried out continually by a small jump amount, that is, by a plurality of pixel electrode distances, for example, by a pitch of one to three or four pixel electrodes. Although this technique can be regarded as sequential scanning by a finer pitch than that of display scanning, while the driving frequency is equal to that upon display, the scanning time between the opposite ends of the screen is shorter than that upon display. As a result, this technique is a technique of "carrying out detection driving scanning for N+1 screens within a period of display driving scanning for N screens."

An example of operation of a shift of movement of a driving object between regions and an example of a continual jump shift are hereinafter described in connection of the other embodiment. It is to be noted that also it is possible to use a combination of regular shift operation and random shift operation such that only the regularity of operation of a shift of movement of a driving object between regions is determined by an algorithm and randomness is applied to a procedure for selection of a driving electrode DE in each region.

Incidentally, while detection driving scanning carried out by the scanning driving section 9 is repetitions of application of a detection driving voltage such as, for example, an AC voltage and shift operation, the two operations are preferably carried out as one cycle in a fixed period. This is because this makes it easy for the touch detection section 8 to decide a timing of detection of presence or absence of touch.

In this instance, the scanning driving section 9, that is, the detection scanning control section, may execute and control halting of driving for more than one cycle within which application of the detection driving voltage is not carried out although the shift is carried out or neither shift nor application of the voltage is carried out periodically or for a certain region.

Particularly in continual jump shift, in order to scan a next screen after rough sequential scanning is carried out from one end to the other end of a screen image, a fly-back period within which the scanning position returns to the first scanning start position and/or a fixed period after the fly-back may be used as the period for halting of driving.

Meanwhile, the touch detection section 8 may be configured such that it includes a noise removing section which detects, within the driving halting period, a noise level from the potential level of the sensor line SLi on which an electric variation is not overlapped and which becomes a detection signal and carries out noise removal. The provision of the noise removing section in the touch detection section 8 is not essentially required, but also it is possible to carry out noise removal by means of a circuit different from the touch detection section 8.

Further, while, in FIG. 4A, the touch detection section 8 is provided in the touch detection apparatus 10, also this itself is not necessarily required. The touch detection apparatus 10 may output n sensor line outputs to the outside such that touch detection is carried out outside the touch detection apparatus 10.

This similarly applies also to the display apparatus according to the second embodiment hereinafter described. In other words, a configuration similar to the touch detection section 8 may be provided outside a display apparatus.

A signal component and a noise component of the sensor line SLi are hereinafter described.

Detection Signal

FIG. 5A illustrates a manner wherein an AC signal source AS drives the first driving electrode DE1 from among the m driving electrodes DE1 to DEm. Meanwhile, FIG. 5B shows an equivalent circuit of the touch sensor where a finger of a user is proximate to an arbitrary one of the n sensors shown in FIG. 5A, that is, a sensor line SLi.

As shown in FIG. 5A, the AC signal source AS is connected to the driving electrode DE1 so that the driving electrode DE1 is AC driven. At this time, the touch sensor is represented by such an equivalent circuit as shown in FIG. 5B. However, it is to be noted here that the capacitance value of each of the capacitance elements $C1\_1$ to $C1\_m$ is represented by "Cp" and a capacitance component connected to the sensor line SLi other than the capacitance elements $C1\_1$ to $C1\_m$, that is, a parasitic capacitance, is represented by "Cc." Further, the effective value of the AC voltage from the AC signal source AS is represented by "V1." At this time, the detection signal Vdet detected by the touch detection section 8 (refer to FIG. 4A) exhibits a voltage Vs when no finger touches but is another voltage Vf (<Vs) when a finger touches. In a relationship to FIGS. 3A to 3C, the voltage Vs corresponds to the "initial detection signal Vdet0" and the voltage Vf corresponds to the "detection signal Vdet1." Voltages Vs, Vf are hereinafter referred to as sensor voltages.

The sensor voltage Vs when no finger touches is represented by such an expression as given in FIG. 5C. From this expression, as the number m of the driving electrodes DE increases, each capacitance value Cp decreases as much. Therefore, "mCp" in the denominator of the expression of FIG. 5C becomes substantially fixed. Further, although the value of the parasitic capacitance Cc is influenced a little by the number m of the driving electrodes DE, it may be regarded as being substantially fixed. Therefore, although the denominator of the expression of FIG. 5C does not exhibit a great variation, the numerator becomes small. Therefore, as the number m of the driving electrodes DE increases, also the magnitude of the sensor voltage Vs, that is, the peak value of the detection signal when no finger touches, decreases. On the other hand, the sensor voltage Vf, that is, the peak value of the detection signal when a finger touches, increases substantially in inverse proportion to "mCp" but increases substantially in proportion to "Cp" similarly to the sensor voltage Vs. This is because the value of the capacitance element C2 added by proximity of a finger is sufficiently lower than the capacitance value Cp.

From the foregoing, as the number m of the driving electrodes DE increases, the peak value of the detection signal decreases.

In contrast, if the number m of the driving electrodes DE is small and the area of the one driving electrode DE1 is large, then although the peak value of the detection signal increases, the resolution, which corresponds to the size of a minimum detection object which can be detected, when the size of a detection object is detected, decreases. Further, in the case of position detection of a detection object, also the accuracy in position detection decreases as the number m decreases. Therefore, if the accuracy in detection of the size and the position of an object is raised to enhance a performance, then it cannot be avoided to reduce the area of one driving electrode DE. However, if the number m of driving electrodes DE is increased to reduce the electrode area, then the peak value of the detection signal of the touch sensor drops.

In the present example, the capacitance value Cp at a crossing location with a driving electrode DE varies in response to the area of one driving electrode DE. In particular, as the area, particularly the width, of the driving electrode DE increases, also the capacitance value Cp increases. Further, as the area, particularly the width, of one sensor line SLi increases, also the capacitance value Cp increases.

Incidentally, if the sensor line SLi includes noise, then the signal component, that is, an average peak value of the sensor voltages Vs and Vf, relatively decreases with respect to the noise component in the detection signal Vdet. Accordingly, the S/N ratio of the detection signal Vdet drops. The S/N ratio decreases as the number m of driving electrodes DE increases and the width of one driving electrode DE decreases. Further, as the magnitudes of the signal component and the noise component become close to each other, application of a noise separation technique becomes difficult. Particularly where the noise component varies periodically and the period of the variation is proximate to the period of the detection signal, it becomes further difficult to separate the noise.

Therefore, the sensitivity of the touch sensor, that is, the resolution of the size of an object to be detected and the accuracy in position detection, and the S/N ratio of the detection signal Vdet have a tradeoff relationship to each other, and even if a noise separation technique such as a noise filter is applied, it is difficult to improve both of them.

Therefore, in the embodiment of the present invention, as a more preferable mode, a period or cycle which does not involve any signal component is provided intentionally to facilitate detection of a noise component. If the noise component detected within the period or cycle is subtracted from a sensor line output within a period which involves both of a signal component and a noise component, then noise removal can be carried out readily. It is to be noted that description of a particular circuit of the noise removing section is omitted herein.

<2. Second Embodiment>

The second embodiment relates to a display apparatus according to the present invention. The display apparatus has a touch sensor function same as that of the display apparatus of the first embodiment.

The display apparatus according to the present embodiment is a liquid crystal display apparatus which uses Vcom driving.

The present invention does not essentially require the Vcom driving. However, the liquid crystal display apparatus described below is generally configured such that it uses the Vcom driving and uses a common electrode or opposing electrode for display driving also for sensor driving to carry out display scanning or writing scanning and sensor driving scanning simultaneously.

At this time, the display driving and the detection driving are preferably synchronized with each other. In other words, in the present embodiment, a driving electrode for the display driving, that is, an opposing electrode, is used also as a driving electrode for the sensor driving in order to achieve synchronous driving. It is to be noted that, for such synchronization, a configuration which generates a synchronizing signal such as a clock signal under the control of a CPU or the like not shown in the display apparatus may be adopted, or a synchronizing signal may be supplied from the outside. Where the display apparatus is a display part such as a liquid crystal display panel, also external synchronization is supposed. On the other hand, where the display apparatus is a system including a display part such as a television apparatus, a monitor apparatus or some other electronic apparatus, a synchronizing signal is generated in the system.

This liquid crystal display apparatus is advantageous in that reduction in thickness of the entire apparatus can be achieved. However, if the display driving frequency and the sensor driving frequency, that is, the detection driving frequency, are set equal to each other, then this gives rise to a disadvantage in a different aspect that the responsibility upon sensor detection is degraded. Therefore, the advantage described hereinabove in connection with the first embodiment, that is, the advantage that the responsibility in sensor detection is improved without raising the detection driving frequency or even where the detection driving frequency is lowered conversely.

It is to be noted that the term "opposing electrode" in the present specification signifies an electrode which plays both of a role of a common electrode or display driving electrode for display driving and another role of a detection driving electrode for touch detection similarly as in the first embodiment. In the following, in order to maintain the consistency with the first embodiment, the term "driving electrode DE" which is used in the description of the first embodiment is used continuously.

Although the sensor detection accuracy increases in proportion to the number of sensor lines, which are also referred to as "detection electrodes" in the description of the present embodiment, if the sensor lines are disposed in a matrix in the x direction and the y direction, then the number of sensor lines becomes very great. In order to reduce the number of sensor lines, it is preferable to use a driving method of AC driving one of a plurality of driving electrodes and shifting an operation object of the AC driving within an array of a plurality of driving electrodes juxtaposed in a fixed pitch. A basic concept of this driving method is adopted also in the first embodiment, and therefore, only sensor lines elongated in the y direction can be used to provide sensor outputs.

While a technique of AC driving an object of the AC driving in a scanning direction, that is, in the y direction, in accordance with a predetermined algorithm, is used, a potential variation of the sensor lines is observed following up the driving operation. Consequently, touch or proximity of a detection object can be detected from the address of a sensor line or detection electrode which exhibits a potential variation such as, for example, a drop of the pulse peak value shown in FIG. 3A and the timing of the potential variation. This itself is similar to that in the first embodiment.

Further, that a jump shift is included in the predetermined algorithm and an advantage by this, that is, improvement in latency, are similar to those in the first embodiment. Also it is similar as in the first embodiment that the jump shift includes a shift between regions and a continual jump shift.

In the following, a configuration and operation of the display apparatus are described first and then a preferable form of shift operation is described.

General Configuration of the Display Apparatus

Figure 6A:
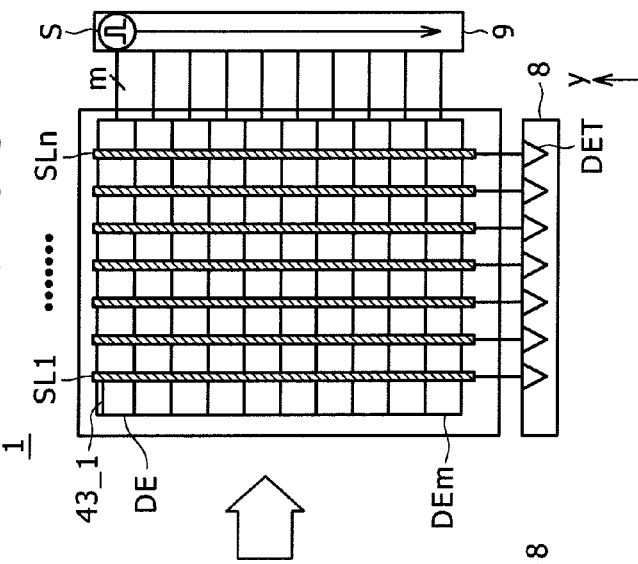
FIGS. 6A to 6C are top plan views and FIG. 6D is a schematic sectional view illustrating a connection scheme between an electrode pattern for touch detection and a driving circuit of the display apparatus according to the second embodiment.
Figure 6B:
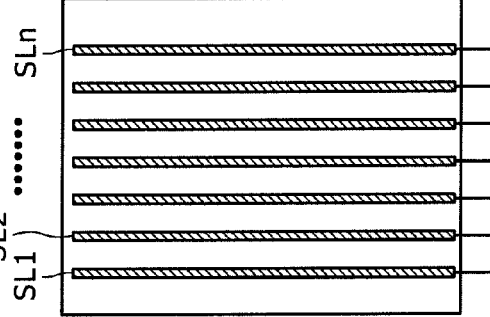
Figure 6C:
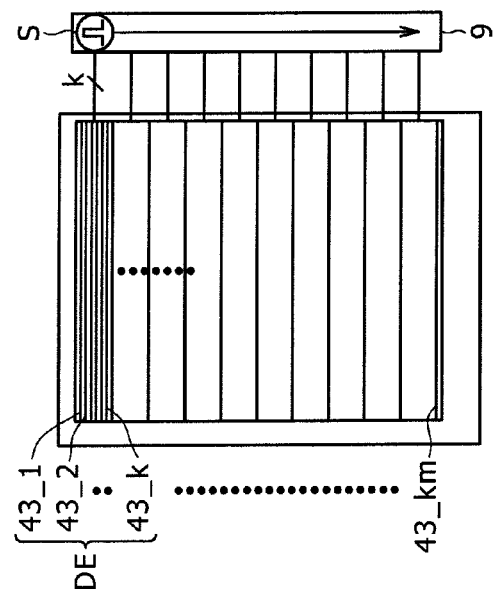
Figure 6D:
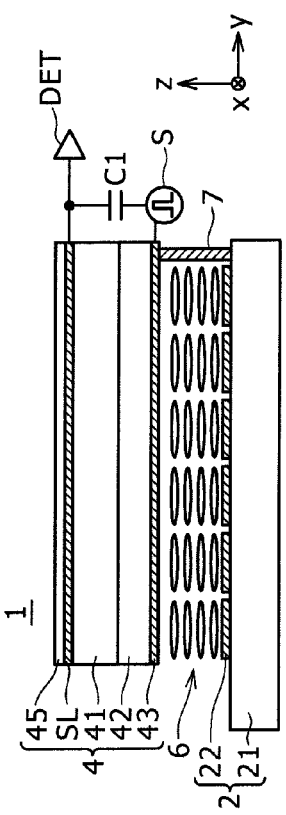
Figure 7:
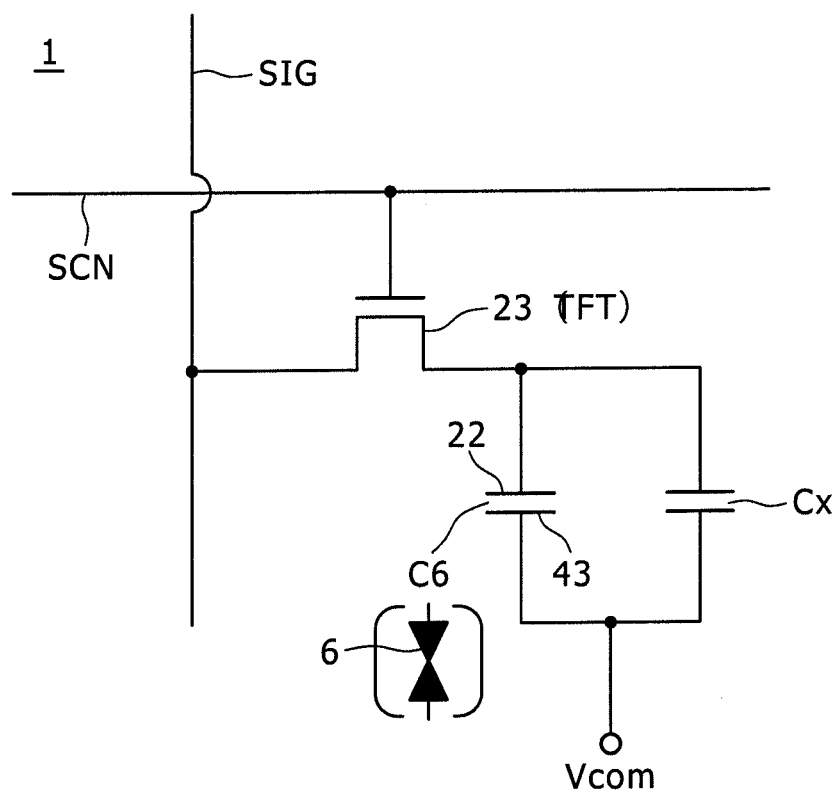
FIG. 7 is an equivalent circuit diagram of a pixel circuit of the display apparatus according to the second embodiment.

FIGS. 6A to 6C show arrangement of electrodes of the display apparatus according to the present embodiment and circuits for driving and detecting the display apparatus. Meanwhile, FIG. 6D shows a schematic sectional structure of the display apparatus. FIG. 7 shows an equivalent circuit diagram of a pixel of the display apparatus.

The display apparatus shown in FIGS. 6A to 6D is a liquid crystal display apparatus which includes a liquid crystal layer as a "display function layer."

The liquid crystal display apparatus includes an electrode, that is, a driving electrode, provided on one of two substrates opposing to each other with a liquid crystal layer interposed therebetween. The driving electrode is common to a plurality of pixels, and a common driving signal Vcom which provides a reference voltage to a signal voltage for gradation display for each pixel is applied to the driving electrode.

In FIG. 6D, in order to facilitate recognition of a sectional structure, the driving electrode, pixel electrodes and detection electrodes which are principal components of the display apparatus are indicated by slanting lines while the other components such as the substrates, insulating films, functional films and so forth are shown without slanting lines. Such omission of slanting lines applies similarly to any other view showing a sectional structure.

The liquid crystal display apparatus 1 includes a plurality of pixels PIX shown in FIG. 7 which are arranged in a matrix. Referring to FIG. 7, each pixel PIX includes a thin film transistor (hereinafter referred to as TFT 23) as a select element of a pixel, an equivalent capacitance C6 of a liquid crystal layer 6, and a holding capacitor Cx as an additional capacitor. The equivalent capacitance C6 representing the liquid crystal layer 6 is connected at one electrode thereof to a pixel electrode 22 which is one of a plurality of pixel electrodes 22 separated for individual pixels and arranged in a matrix. The other electrode of the equivalent capacitance C6 is a driving electrode 43 which is common to the plural electrodes.

The pixel electrode 22 is connected to one of the source and the drain of the TFT 23, and an image signal line SIG is connected to the other of the source and the drain of the TFT 23. The image signal line SIG is connected to a vertical driving circuit not shown such that an image signal having a signal voltage is supplied from the vertical driving circuit to the image signal line SIG.

To the driving electrode 43, the common driving signal Vcom is applied. The common driving signal Vcom is a signal having a center potential and positive and negative potentials with reference to the center potential and appearing alternately for every one horizontal period (1H).

The gate of the TFT 23 is electrically common among all pixels PIX juxtaposed in a row direction, that is, in the horizontal transverse direction of the display screen, thereby to form a scanning line SCN. The scanning line SCN is supplied with a gate pulse outputted from the vertical driving circuit not shown for opening and closing the gate of the TFTs 23. Therefore, the scanning line SCN is referred to also as gate line.

Referring to FIG. 7, the holding capacitor Cx is connected in parallel to the equivalent capacitance C6. The holding capacitor Cx is provided in order to prevent the writing potential from being lowered by leakage current of the TFT 23 because the storage capacity is insufficient with the equivalent capacitance C6. The addition of the holding capacitor Cx is effective also to prevention of flickering and improvement in uniformity of the screen luminance.

As viewed in the sectional structure shown in FIG. 6D, the liquid crystal display apparatus 1 includes a substrate 2 (hereinafter referred to as driving substrate 2) on which a TFT 23 is formed at a place which does not appear on the cross section and to which a driving signal or signal voltage for the pixels is supplied. The liquid crystal display apparatus 1 includes an opposing substrate 4 disposed in an opposing relationship to the driving substrate 2, and a liquid crystal layer 6 disposed between the driving substrate 2 and the opposing substrate 4.

The driving substrate 2 includes a TFT substrate 21 which serves as a circuit board on which the TFT 23 of FIG. 7 is formed and which has a body portion made of glass or the like, and a plurality of pixel electrodes 22 arranged in a matrix on the TFT substrate 21.

Display drivers not shown including a vertical driving circuit, a horizontal driving circuit and so forth for driving the pixel electrodes 22 are formed on the TFT substrate 21. Further, such TFTs 23 as shown in FIG. 7 and wiring lines such as image signal lines SIG and scanning lines SCN are formed on the TFT substrate 21. The touch detection section 8 described hereinabove with reference to FIGS. 4A and 4B in the description of the first embodiment is formed on the TFT substrate 21.

The opposing substrate 4 includes a glass substrate 41, a color filter 42 formed on one face of the glass substrate 41, and a driving electrode 43 formed on the color filter 42 adjacent the liquid crystal layer 6. The color filter 42 is formed from color filters of, for example, three colors of red (R), green (G) and blue (B) arrayed periodically, and one of the three colors of R, G and B is associated with each pixel PIX, that is, with each pixel electrode 22. It is to be noted that a pixel with which one color is associated is referred to as sub pixel, and sub pixels of the three colors of R, G and B are sometimes referred to as pixel. However, also a sub pixel is referred to as pixel PIX here.

The driving electrode 43 serves also as the driving electrode DE (refer to the first embodiment) of a touch detector sensor which forms part of a touch sensor for carrying out touch detection operation. The driving electrode 43 corresponds to the driving electrode E1 in FIGS. 1A to 2B.

The driving electrode 43 is connected to the TFT substrate 21 by a contact conducting column 7. The common driving signal Vcom having an AC pulse waveform is applied from the TFT substrate 21 to the driving electrode 43 through the contact conducting column 7. The common driving signal Vcom corresponds to the AC pulse signal Sg supplied from the AC signal source AS of FIGS. 1A to 2B.

The sensor lines SL are formed on the face of the glass substrate 41 adjacent the display face, and a protective layer 45 is formed on the sensor lines SL. The sensor lines SL form part of the touch sensor and correspond to the detection electrodes E2 in FIGS. 1A to 2B. The touch detection section 8 shown in FIG. 4A for carrying out touch detection operation may be formed on the glass substrate 41.

The liquid crystal layer 6 serves as a "display function layer" and modulates light which passes therethrough in the thicknesswise direction, that is, in an opposing direction to the electrode, in response to the state of an electric field applied thereto. The liquid crystal layer 6 is formed using a liquid crystal material of any of various modes such as, for example, the TN (twisted nematic) mode, VA (vertical alignment) mode and ECB (electric field controlling birefringence) mode.

It is to be noted that an orientation film is disposed between the liquid crystal layer 6 and the driving substrate 2 and between the liquid crystal layer 6 and the opposing substrate 4. Further, a polarizing plate is disposed on a face of the driving substrate 2 remote from the display face, that is, on the rear face side and also on a face of the opposing substrate 4 adjacent the display face. Such optical function layers as just mentioned are omitted in FIGS. 6A to 6D.

Example of a Basic Configuration of the Touch Detection Section

Figure 8:
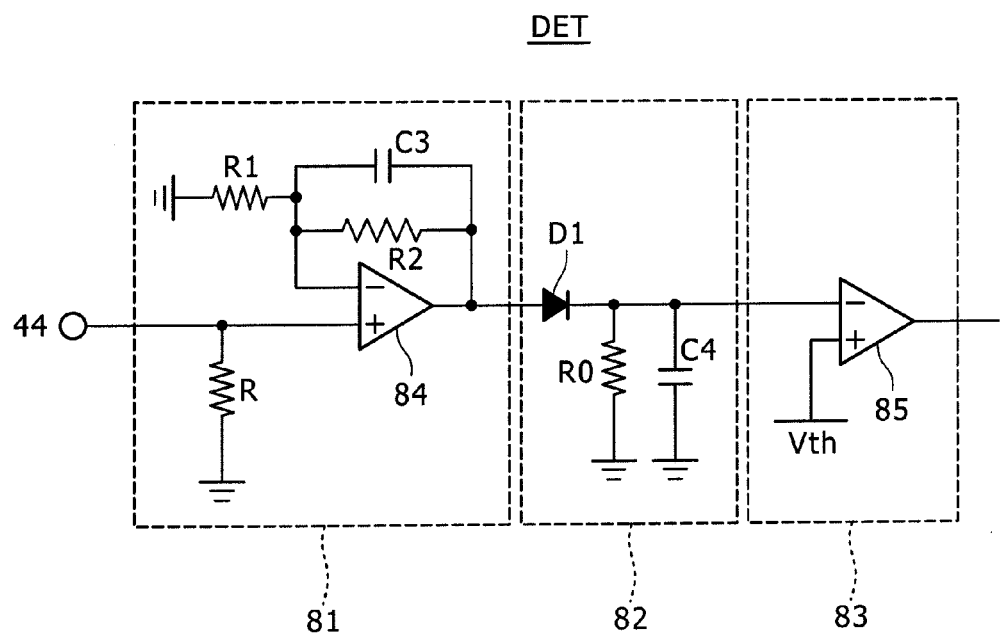
FIG. 8 is a circuit diagram showing an example of a circuit of a touch detection section of the display apparatus according to the second embodiment.

FIG. 8 shows a circuit of the voltage detector DET which is a basic component of the touch detection section 8 in the present embodiment.

Referring to FIG. 8, the voltage detector DET includes an operational amplifier 81, a rectification circuit 82 and an outputting circuit 83.

The components of the voltage detector DET are described successively with reference to FIG. 8.

In the voltage detector DET, the operational amplifier 81 includes an operational amplifier 84, resistors R, R1 and R2, and a capacitor C3 and is configured so as to function not only as a signal amplification circuit but also as a filter circuit. In particular, the operational amplifier 81 amplifies a detection signal Vdet outputted from a detection electrode 44, removes a predetermined frequency component from the detection signal Vdet and outputs a resulting signal to the rectification circuit 82.

In particular, in the operational amplifier 81, the detection electrode 44 is electrically connected to a non-inverting input "+" of the operational amplifier 84 such that the detection signal Vdet outputted from the detection electrode 44 is inputted to the non-inverting input terminal of the operational amplifier 84. Here, the detection electrode 44 is connected to a ground potential through the resistor R in order to electrically fix the DC level of the potential. Meanwhile, the resistor R2 and the capacitor C3 are connected in parallel between the inverting input "−" and the output of the operational amplifier 84, and the resistor R1 is connected between the inverting input "−" and the ground potential.

In the voltage detector DET, the rectification circuit 82 includes a diode D1, a charging capacitor C4, and a discharging resistor R0. The rectification circuit 82 is configured such that a signal outputted from the operational amplifier 81 is half-wave rectified by the diode D1 first and is then smoothed by a smoothing circuit formed from the charging capacitor C4 and the discharging resistor R0. Then, the smoothed signal is outputted to the outputting circuit 83.

In particular, in the rectification circuit 82, the diode D1 is electrically connected at the anode thereof to the output terminal of the operational amplifier 81. The charging capacitor C4 and the discharging resistor R0 are electrically connected individually between the cathode of the diode D1 and the ground potential.

In the voltage detector DET, the outputting circuit 83 includes a comparator 85 and is configured such that it functions as an AD converter for converting an analog signal outputted from the rectification circuit 82 into a digital signal.

In particular, the comparator 85 is electrically connected at a non-inverting input terminal (+) thereof to the rectification circuit 82. Further, a threshold voltage Vth is inputted to the negative input terminal (−) of the comparator 85. The comparator 85 carries out a comparison process of the analog signal outputted from the rectification circuit 82 with the threshold voltage Vth and outputs a digital signal based on a result of the comparison process.

Such voltage detectors DET are disposed in a juxtaposed relationship, for example, on one end side of the opposing substrate 4 in a longitudinal direction of the detection electrode 44 around the display region thereby to form the touch detection section 8. It is to be noted that the touch detection section 8 whose basic configuration is the voltage detector DET may be disposed on the other end side or on the opposite end sides of the detection electrode 44. Where the touch detection section 8 is disposed on the opposite end sides, for example, those voltage detectors DET which correspond to odd-numbered ones of the detection electrodes 44 may be disposed on one end side in the lengthwise direction of the detection electrodes 44 while those voltage detectors DET which correspond to even-numbered ones of the detection electrodes 44 are disposed on the other end side.

Configuration of the Driving Electrodes and Driving Scanning

The driving electrode 43 is divided in the direction of a row or a column of the pixel array as seen in FIG. 6A, in the present example, in the direction of a column, that is, in a vertical direction in FIG. 6A. The direction of the division corresponds to a scanning direction of a pixel line in display driving, in particular, in a direction in which the vertical driving circuit not shown successively activates the scanning lines SCN.

The driving electrode 43 is divided into totaling k×m electrodes. Therefore, the driving electrodes 43_1, 43_2, . . . , 43_k, . . . , 43_km are disposed in a plane such that they have a belt-like pattern elongated in the row direction and spread in parallel to each other and in a mutually spaced relationship in the plane.

The divisional arrangement pitch of the k×m divisional driving electrodes 43_1 to 43_km is set equal to the (sub) pixel pitch or to a natural number of times the arrangement pitch of the pixel electrodes. Here, it is assumed that the divisional arrangement pitch of the driving electrodes is equal to the arrangement pitch of the pixel electrodes.

It is to be noted that the reference character "DE" (DE1, DE2, DE3, . . . , DEm) in FIGS. 4A and 4B represents a set of k (>2) driving electrodes, and AC driving is carried out in a unit of this number of driving electrodes. This unit corresponds to the driving electrode DE in the first embodiment. The reason why the unit of the AC driving is set greater than one pixel line is that it is intended to increase the capacitance of the touch sensor to raise the detection sensitivity. On the other hand, it is possible to shift the driving electrode DE by an amount equal to a natural number of times the arrangement pitch unit to make the shift invisible.

On the other hand, in the Vcom driving which is carried out in a unit of a driving electrode DE in this manner, the shift operation is carried out by the scanning driving section 9 provided in the vertical driving circuit not shown, that is, the writing driving scanning section, and serving as a "detection scanning control section." A predetermined algorithm executed by the scanning driving section 9 is the same as the predetermined algorithm whose outline is described hereinabove in connection with the first embodiment.

Meanwhile, the n sensor lines SL1 to SLn are formed from wiring lines of parallel stripes elongated in the y direction similarly as in the first embodiment. The n sensor line outputs from the n sensor lines SL1 to SLn are inputted to the touch detection section 8.

It is to be noted that FIGS. 6A and 6B show the electrode patterns of the driving electrodes 43_1 to 43_km and the sensor lines SLi separately, respectively. However, actually the driving electrodes 43_1 to 43_km and the sensor lines SLi are disposed in an overlapping relationship as seen in FIG. 6C.

By the configuration just described, the touch detection section 8 can detect a position in the row direction depending upon with which detection circuit DET a voltage variation occurs and can acquire position information in a column direction depending upon the timing upon such detection. In other words, it is assumed that the Vcom driving of the scanning driving section 9 and operation of the touch detection section 8 are carried out in synchronism with each other, for example, by a clock signal of a predetermined period. Since it can be found by such synchronous operation as described above which one of the driving electrodes the scanning driving section 9 is driving at the timing at which the touch detection section 8 acquires a voltage variation, the center of the touching position of a finger can be detected. Such detection operation is controlled by a computer-based supervisory control circuit which supervises the entire liquid crystal display apparatus 1, for example, a CPU, a microcomputer or a control circuit for touch detection.

While the scanning driving section 9 as the "detection scanning control section" is formed on the driving substrate 2 side of FIG. 6D, the touch detection section 8 may be formed on the driving substrate 2 or may be formed on the opposing substrate 4 side or else may be disposed externally of the liquid crystal display apparatus 1.

Since many TFTs are integrated, in order to reduce the number of fabrication steps, preferably the touch detection section 8 can be formed together with the driving substrate 2. However, the sensor lines SL are sometimes provided on the opposing substrate 4 side, and since the sensor lines SL are formed from a transparent electrode material, they sometimes have high wiring line resistance. In such a case, in order to avoid the drawback that the wiring line resistance is high, preferably the touch detection section 8 is formed on the opposing substrate 4 side. However, if a TFT formation process is used for the opposing substrate 4 only for the sake of the touch detection section 8, then this gives rise to a disadvantage that an increased cost is required. The formation position of the touch detection section 8 may be determined taking such advantages and disadvantages as described above into consideration.

Lateral Field Mode Liquid Crystal Display Apparatus

Figure 9:
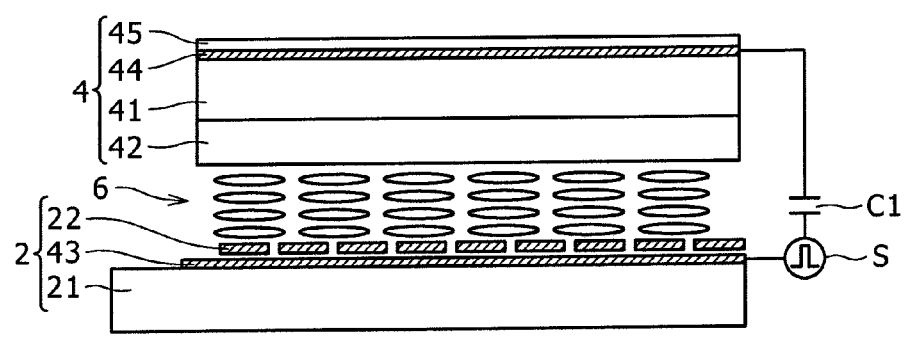
FIG. 9 is a schematic sectional view of a liquid crystal display apparatus of a lateral field mode according to the second embodiment.

FIG. 9 shows a schematic sectional structure of a display apparatus of a more preferable structure according to the second embodiment.

The liquid crystal display apparatus shown in FIG. 9 is different from the liquid crystal display apparatus shown in FIG. 6D in that the driving electrode 43 is disposed on the driving substrate 2 side. The driving electrode 43 in the present embodiment is disposed in an opposing relationship to the pixel electrodes 22 on the opposite side to the liquid crystal layer 6 with respect to the pixel electrodes 22. Here, though not particularly shown, the distance between the pixel electrodes 22 is comparatively great such that the driving electrode 43 generates an electric field so as to act upon the liquid crystal layer 6 from between the pixel electrodes 22. In other words, liquid crystal display of the lateral field mode wherein the direction in which the electric field acts upon the liquid crystal layer 6 is the lateral direction is obtained. The configuration of the other part of the liquid crystal display apparatus is similar, in regard only to the arrangement on a cross section, to that shown in FIG. 6D.

Since the capacitance element C1 is formed between a sensor line SL and the driving electrode 43, the capacitance value is lower than that in the case of FIG. 6D. However, such a countermeasure as to compensate for increase of the distance between the electrodes by means of increase of the width of electrodes is possible, and the sensitivity may possibly be raised from a relationship with the capacitance element C2.

The liquid crystal layer 6 modulates light which passes therethrough in response to the state of an electric field, and liquid crystal of a lateral field mode such as, for example, the FFS (fringe field switching) mode or the IPS (in-plane switching mode) is used for the liquid crystal layer 6.

In the following, several forms of particular shift operation are described as examples where the regular shift operation described hereinabove in connection with the first embodiment is applied to a liquid crystal apparatus according to the second embodiment.

First Example of Shift Operation

FIG. 10A schematically illustrates transition of a driving electrode of a voltage application object in a first example of shift operation. In FIG. 10A, three sensor lines SL are indicated by a vertical blank line for the convenience of illustration. Further, a portion indicated by horizontal stripe lines represents a driving electrode DE, and a single black horizontal line represents a display pixel line PL. A broken line arrow mark indicated along an axis of ordinate in FIG. 10A indicates a basic scanning direction. It is to be noted that, in FIG. 10A, a plan view for nine cycles when the time elapses from the left toward the right in the figure is shown. It is to be noted that one cycle corresponds to a 1H horizontal period in display control.

In FIG. 10B, pulses of gate signals Gate(N) to Gate(N+8) to be applied to a scanning line SCN in the first example of shift operation and positions of the driving electrode DE upon application of the pulses are illustrated as a schematic timing chart. In FIG. 10B, a portion defined by a thick broken line indicates a range of a driving electrode DE of a voltage application object. The axis of ordinate in FIG. 10B indicates the address of pixel lines and the axis of abscissa indicates time. As the addresses of pixel lines, only necessary ones of reference characters "Line(N) to Line(N+8)" and reference characters "Line(M) to Line(M+8)" are shown.

A region which includes the reference characters "Line (N) to Line(N+8)" is hereinafter referred to as region A and another region which includes the reference characters "Line (M) to Line(M+8)" is hereinafter referred to as region B.

The first example of shift operation is characterized in that, by carrying out jump shift between two regions such as the region A and the region B, detection driving is carried out alternately between the two regions. Thereupon, odd-numbered driving electrodes DE_A1, DE_A2, DE_A5 selected in the region A exhibit timings overlapping with those of odd-numbered pulses of the gate signals Gate(N) to Gate (N+8) of display driving. Therefore, it is necessary for the display driving voltage Vcom and the detection driving voltage COM to be a common voltage. In other words, the magnitude of the detection driving voltage COM is set equal to that of the common driving signal Vcom.

It is to be noted that, as regards expression of the detection driving voltage COM, for example, the first detection driving voltage COM is represented by a reference character "COM(N) to COM(N−α)." For example, in the present example, α is α=4, and five driving electrodes DE are driven simultaneously. Where α is α=0, the driving electrodes DE are driven one by one. However, since, in FIGS. 5A to 5C, "m" becomes great, the detection sensitivity drops. Therefore, normally it is desirable to set a to a comparatively high value.

Further, in the first example of shift operation, in both of the region A and the region B, the shift width of the driving electrode DE corresponds to two pixel lines and has a comparatively small shift amount. In particular, for example, in regard to the region A, it can be recognized from FIG. 10B that the first driving electrode DE_A1 and the next driving electrode DE_A2 exhibit a shift amount corresponding to two lines. This is because, if the shift amount is increased in the same region, then changeover between driving electrodes stands out.

It is to be noted that, since such suppression of the shift amount is for eliminating such a fault that changeover stands out by application to a display apparatus, a detection apparatus by itself exhibits low necessity as in the first embodiment. However, in regard to the same region, control is facilitated where the shift amount is reduced. Further, since the driving electrode 43 (basic configuration of the driving electrode DE) to be added newly or to be excepted newly is limited to two preceding and succeeding lines, a small shift amount is desirable in the same region in order to suppress power consumption and achieve stabilized operation.

On the other hand, since the driving electrodes DE repeat movement of a driving object between regions for every one cycle (1H), object detection at a comparatively early stage is possible in comparison with sequential scanning. Roughly speaking, in the case of division into two regions, the probability that an object such as a finger or a stylus pen is detected in a period of time of one half becomes highest.

Since α is α=4 and five driving electrodes 43 are included in one driving electrode DE, the value of m in the expression given in FIG. 5C is reduced to ⅕ the actual dividing number and the effective value of the sensor voltage Vs increases as much. On the other hand, the unit to be newly included into a selection group (driving electrode DE) and to be removed from the selection group instead corresponds to two pixel lines as seen in FIGS. 10A and 10B. This shift operation for every two pixel lines is finer in pitch or shift amount of the shift operation in comparison with shift operation which repeats changeover of five pixel lines with different five pixel lines adjacent the five pixel lines. Since the shift amount is smaller, in the shift operation for every two pixel lines, an image variation arising from the shift of AC driving is less likely to be visually observed by the eye of human beings. In this regard, shift operation for every one pixel line is more desirable. However, where the shift amount is excessively small, then much time is required for detection scanning over the entire one screen. Further, since the size of a detection object such as a finger or a stylus pen is sufficiently greater than the pitch of the pixel lines, in most cases, the high detection accuracy by shift amount for every one pixel line is more than sufficient.

From the foregoing, the shift amount of the driving electrode DE should be determined totally taking to make shift of the driving electrode DE invisible, the detection time period for one pixel and the detection accuracy into consideration.

In the following, several examples of shift operation are described with reference to FIGS. 11A and 11B to 17A and 17B similar to FIGS. 9A and 9B. Since the manner of representation of the figures is described hereinabove in connection with FIGS. 10A and 10B, only differences in shift operation from those in FIGS. 10A and 10B are described below.

Second Example of Shift Operation

Figures 11A, 11B:
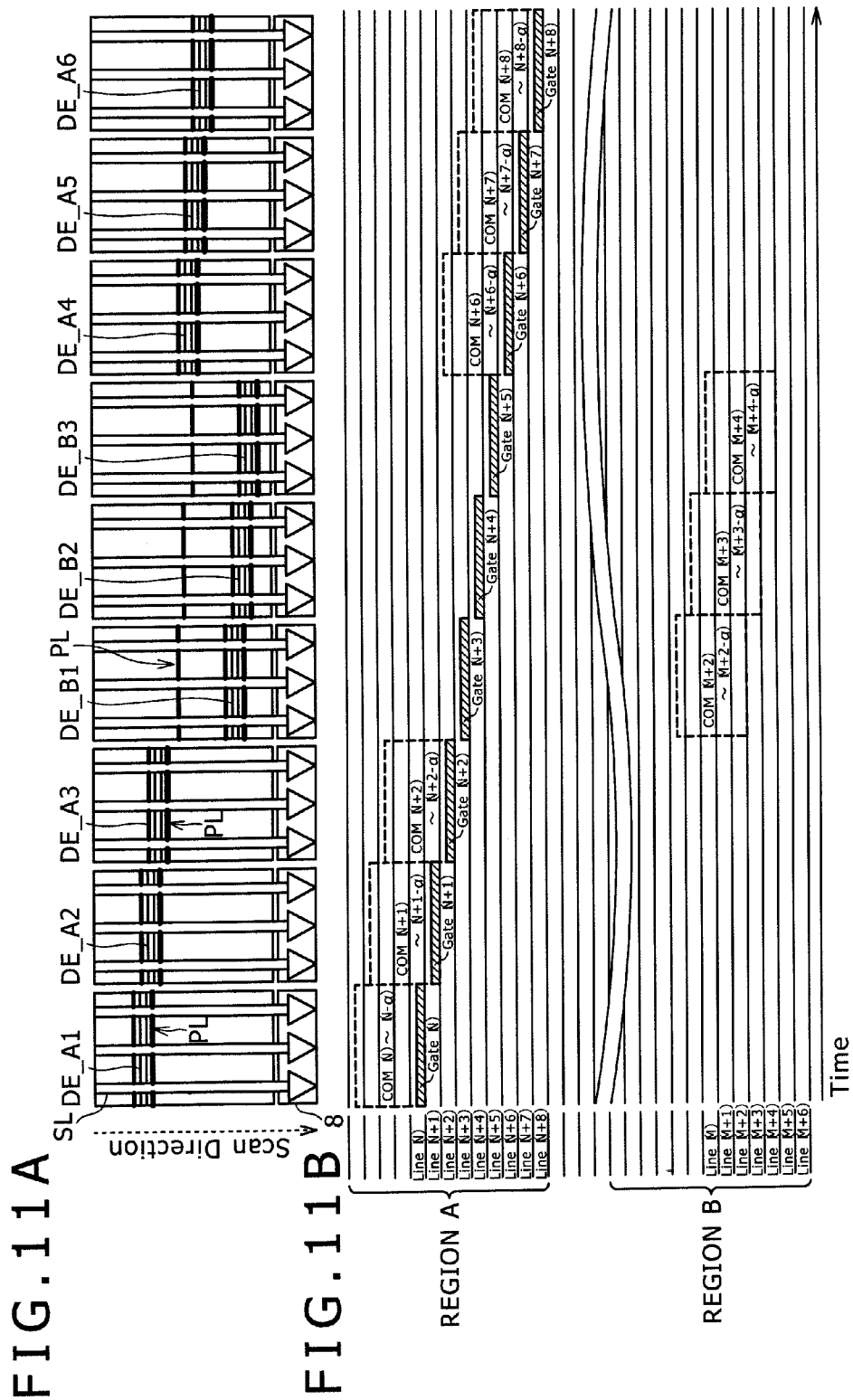
FIGS. 11A and 11B are diagrammatic views of a second example of shift operation.

In a second example of shift operation illustrated in FIGS. 11A and 11B, although the dividing number of the region is the same as that in the case of FIG. 9, sequential shift operation for the individual pixel lines is carried out twice in the region A, jump shift operation to the region B is carried out. Similarly, after sequential operation for the individual pixel lines is carried out twice in the region B, jump shift operation to the region A is carried out.

By repetitions of the operation, sequential shift operation is carried out with the three driving electrodes DE in the two regions including the region A and the region B. Therefore, detection operation carried out alternately in the region A and the region B for every 3H.

Third Example of Shift Operation

Figure 12A:
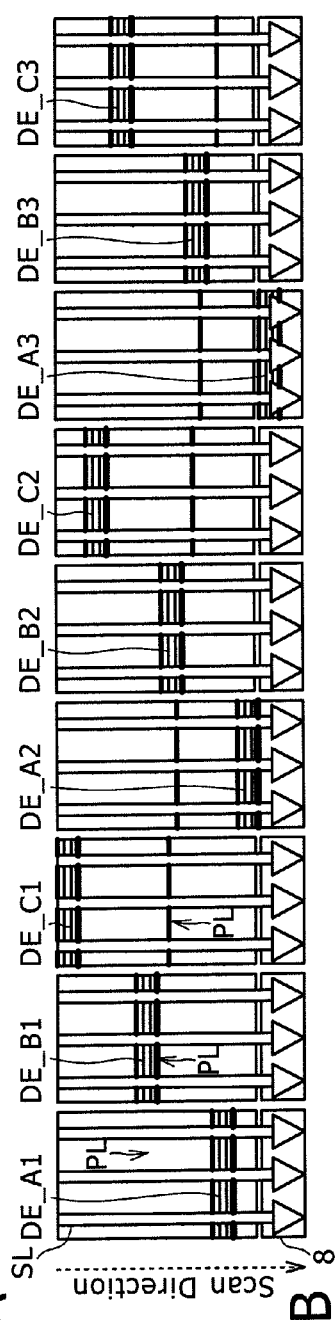
FIGS. 12A and 12B are diagrammatic views of a third example of shift operation.
Figure 12B:
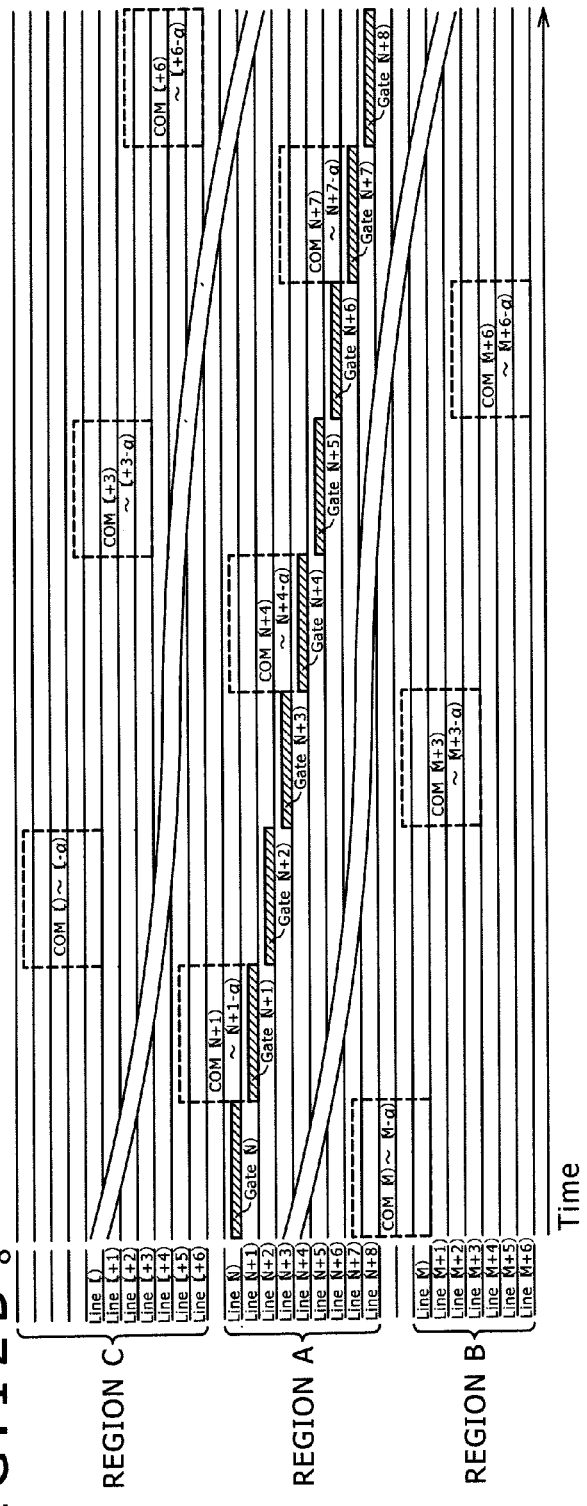

In a third example of shift operation illustrated in FIGS. 12A and 12B, the dividing number of the region is increased by one and therefore to three. A region including addresses "Line(L) to Line(L+6)" of pixel lines in FIG. 12B is hereinafter referred to as region C.

Movement between regions is carried in order of the region B, region A and region C as seen in FIGS. 12A and 12B, and this is repeated. While, in the present example, display of a display pixel line PL and the driving range of the driving electrode DE overlap with each other in the region A, such overlap is likely to appear also in the region B and the region C.

In the present example, jump shift operation is repeated successively in the three regions of the region B, region A and region C, and detection operation between different regions of one display screen is carried out for every 1H.

Fourth Example of Shift Operation

Figures 13A, 13B:
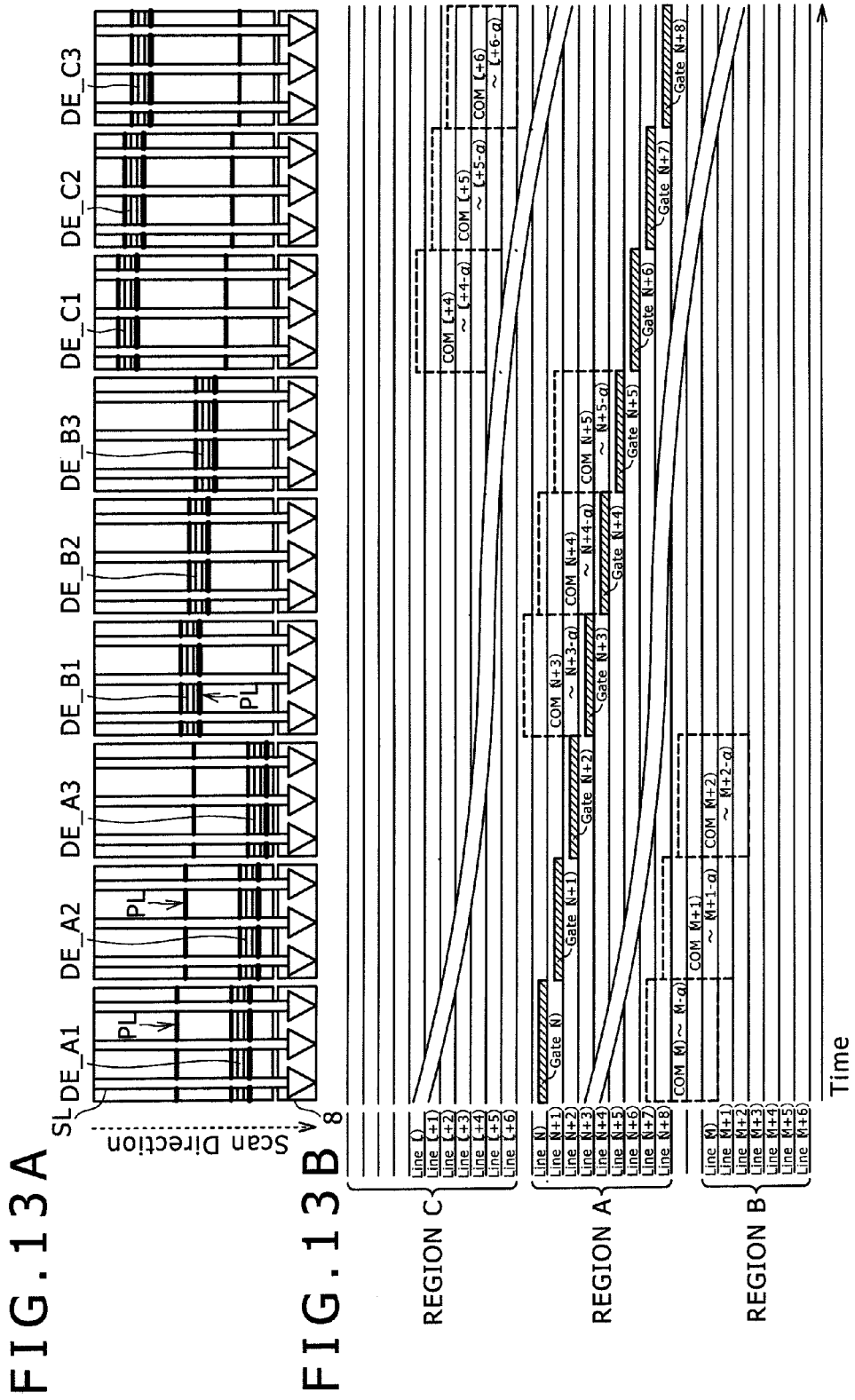
FIGS. 13A and 13B are diagrammatic views of a fourth example of shift operation.

In a fourth example of shift operation illustrated in FIGS. 13A and 13B, the dividing number is three similarly as in the third example of shift operation. However, in the present example, after sequential shift operation for the individual pixel lines is carried out twice in each region, jump shift operation to a next region is carried out similarly as in the second example of shift operation.

Movement between regions is carried out in order of the region B, region A and region C similarly to the movement of a driving object described hereinabove with reference to FIGS. 12A and 12B, and this is repeated. While, in the present example, display of a display pixel line PL and the driving range of the driving electrode DE overlap with each other in the region A, such overlap is likely to occur also in the region B and the region C.

In the present example, jump shift operation is repeated successively in the three regions of the region B, region A and region C, and besides sequential shift operation is carried out in the three driving electrodes DE in each region. Therefore, detection operation is carried out successively in the three regions of the region B, region A and region C for every 3H.

Fifth Example of Shift Operation

In a fifth example of shift operation illustrated in FIGS. 14A and 14B, the dividing number of the region is set to three similarly as in the third example of shift operation. Further, jump shift operation is carried out basically every time similarly as in the third example of shift operation. However, in the fifth example of shift operation, detection operation in the region C is not carried out, and therefore, detection driving for a period of 2H and a halting period for 1H are repeated. For example, if the region C is a display screen region which does not include an operation section in a display application or the like, then touch detection in the region C makes no sense. Thus, detection operation in such region C is halted.

Within the halting period of touch detection, only jump shift operation between regions is carried out, but actual application of the detection driving voltage COM is not carried out. Therefore, during a period corresponding to the 1H period of the sensor line output, only noise components are superposed. Accordingly, the sensor line output within the halting period can be used to carry out the noise removing process described in connection with the first embodiment.

Sixth Example of Shift Operation

In the fifth example of shift operation described above, a period corresponding to the region C is used as the halting period.

In contrast, in a sixth example of shift operation illustrated in FIGS. 15A and 15B, a halting period within which detection operation is not carried out in any region is provided periodically, for example, for every 3H. Such an example of shift operation as just described is used suitably, for example, in the following case. In particular, there is the possibility that an operation may be carried out for any region of the effective display screen, and if touch detection is not carried out only for a particular region, then some inconvenience may occur. In such an instance, a halting period should be provided periodically as in the case of the sixth example.

As operation within the halting period of touch detection, only jump shift operation between regions is carried out but actual application of the detection driving voltage COM is not carried out similarly as in the fifth example of shift operation. Therefore, the sensor line output exhibits a period within which only noise components are superposed at a rate of one 1H period to a 3H period. Accordingly, the sensor line output within the halting period can be used to carry out the noise removing process described hereinabove in connection with the first embodiment.

The foregoing six examples of shift operation which involve movement of a driving object between regions are mere examples, and the region dividing number and the manner of provision of a halting period can be determined arbitrarily. For example, as regards the dividing number, the dividing number of regions may be determined in response to the size of the detection face and so forth. Further, where the region dividing number is great, shift operation for one screen may be carried out including jumping over of regions. In particular, while, in the first to sixth examples of shift operation, the movement of a driving object between regions by jump shift is always movement to a next adjacent region, jump shift to a region spaced by more than one region distance other than a next adjacent region can be carried out. After such region jump shift is carried out for one screen, a driving object is moved by region jump shift to the remaining regions. Such a sequence of movement is repeated until all regions of the screen are scanned. Such jumping over shift operation wherein the driving object moves jumping over a region or regions is preferable in a sense that an object can be detected at a comparatively early stage.

Now, two examples of operation wherein jump shift is carried out normally during scanning of one screen.

Seventh Example of Shift Operation

FIGS. 16A and 16B schematically illustrate a seventh example of shift operation.

FIG. 16A illustrates pulses of a gate signal (Gate(M) to Gate(N) (N>M)) to be applied to the scanning line SCN in the seventh example of shift operation and positions of the driving electrodes DE upon application of the pulses. The broken line representation of a range of a driving electrode DE in FIG. 10B and the representation of the axis of ordinate and the axis of abscissa of FIGS. 10A and 10B are the same as those of the other examples of operation described hereinabove. While the address of a pixel line is indicated by reference character "Line(M) to Line(N)," and the address of pixel lines in the proximity of a middle one of the N vertical pixel lines is indicated by reference characters "Line(N/2−2) to Line(N/2+3)." It is to be noted that the reference character "M" represents the address of a pixel line positioned on one end side of the screen which is greater than one, and several ten to several hundred pixel line addresses exist between the addresses "M+3" and "N/2−2." Similarly, several ten to several hundred pixel line addresses exist between the addresses "N/2+3" and "N−2."

In the seventh example of shift operation, display driving is carried out for one by one pixel line for every one horizontal period (1H).

Shift operation between the driving electrodes DE is repeated taking this 1H as one cycle. At this time, in the present example of operation, upon transition from one cycle (1H) to a next one cycle (1H), shift by two pixel lines is carried out, and within the period, also the writing line or display line advances by one line distance. Therefore, the relative line conversion speed difference corresponds to two lines, and this is hereinafter referred to as two-line jump. The jump line number K=2 at this time represents the relative shift ratio of the shift as it is, and in the present example, the shift is double-speed shift.

In the present example of operation, since double speed shift is carried out, detection scanning for two screens is carried out within a period for writing scanning or display scanning for one screen. In short, a technique of "carrying out detection driving scanning for two (=N+1) screens within a period for display driving scanning for one (=N) screen" corresponds to the seventh example of shift operation.

Eighth Example of Shift Operation

FIGS. 17A and 17B schematically illustrate an eighth example of shift operation. The manner of representation of FIGS. 17A and 17B is similar to that of FIGS. 16A and 16B.

In the present example of shift operation, upon transition from one cycle (1H) to a next one cycle (1H), shift by three pixel lines is carried out. However, within this period, also the writing line, that is, the display line, advances by one line. Therefore, the relative line conversion speed difference corresponds to three lines, and this is hereinafter referred to as three-line jump. The jump line number K at this time is K=3, and this represents as it is the relative speed ratio of shift. In the present example, the manner of shift is triple-speed shift.

In the present example of operation, since the manner of shift is triple-speed shift, detection scanning for three screens is carried out within a period of writing scanning or display scanning for one screen. In other words, a technique of "carrying out detection driving scanning for three (>N+1) screens within a period of display driving scanning for one (=N) screen" is the eighth example of shift operation.

The two examples of operation of continual jump shift described above relate to cases wherein N=1 and M is 2 and 3. However, N and M may have arbitrary values. It is to be noted that the value of N is not limited to a natural number equal to or higher than 2 but may be a fraction higher than 1 such as 3/2, 4/2, 4/3, 5/2, 5/3, 5/4, . . . . Further, where an operation stopping period for a fixed number of lines is provided between frames or in a like case, N may not be represented as a fraction.

Also it is possible to use detection scanning wherein jump is carried out completely such that a display pixel line for which display scanning is being carried out and a detection line for which detection scanning is being carried out do not overlap with each other. In this instance, although several lines may not undergo detection scanning, since such several non-detection lines do not matter with respect to a fingertip or a stylus pen of a detection object, object touch or object detection can be carried out normally.

From the foregoing, the concept of the shift technique with regard to which the seventh and eighth examples of shift operation are given as particular examples can be regarded as "to carry out detection driving scanning for N+1 screens or more within a period of display driving scanning for N screens."

The technique wherein continual jump scanning is carried out within a scanning period for one screen as in the seventh and eighth examples of shift operation has an advantage that, since it is sequential scanning in one direction, the configuration of the driving system circuit including the scanning driving section 9 can be simplified. Further, while the touch detection section 8 carries out touch detection in synchronism with the scanning driving section 9, a timing at which a sensor voltage variation occurs within a scanning period of one screen is likely to be decided as a position in a screen at which touch or proximity occurs.

Therefore, also the configuration of the touch detection section 8 can be simplified. Also the processing burden on the control circuit such as a CPU for controlling various driving circuits including the touch detection section 8 and the scanning driving section 9 is reduced.

Further, where the application voltage upon display scanning and the application voltage upon detection scanning are set equal to each other, there is no interference between a pixel line for which display driving is being carried out and another pixel line for which detection scanning is being carried out, and even if such interference should occur, it is very little.

Where detection scanning is carried out completely jumping over a pixel line under display scanning described hereinabove, since the detection driving voltage COM can be controlled independently of the common driving signal Vcom, even if the two voltages are set to different application voltages, they do not interfere with each other. However, in the case of complete jumping over, display driving and detection driving must be essentially required.

From the foregoing, such a disadvantage that one of display driving and detection driving interferes with the other of them to deteriorate the display quality or to give rise to a detection error can be prevented.

It is to be noted that such control as to prevent a pixel line group for detection driving, that is, the range of the driving electrodes DE, and the display pixel line PL from overlapping with each other anytime can be carried out also by detection driving scanning which involves shift between regions as in the first to sixth examples of shift operation.

In the first to eighth examples of shift operation, except a period within which driving halting is carried out, when the writing line or display line advances by a one-line distance, a shift of the driving electrode DE is carried out without fail. The shift of the driving electrode DE is not limited to this.

For example, a period within which the display line advances a distance of a predetermined number of lines greater than one is set as a standby period within which a shift of the driving electrode DE is not carried out. Then, a shift of the driving electrode DE is carried out after the standby period in which the display line advances by the distance of the predetermined number of lines comes to end.

It is possible to carry out the detection driving scanning where the repetitions of the standby and the shift (hereinafter referred to as shift operation with standby) are determined as one cycle.

It is to be noted that, where the halting period described hereinabove is provided, a driving halting period for one cycle or more within which application of the detection driving voltage is not carried out although the shift is carried out or within which none of a shift and application of the voltage is carried out is provided at a ratio of once to several cycles.

In contrast, the standby period is different from the halting period in that it is a period which is set short within one cycle and within which no shift is carried out from a relationship to the display line scanning.

It is to be noted that shift operation with standby may be used to carry out driving halting at a ratio of once to several cycles.

In particular, an example of shift operation with standby is described, for example, with reference to FIGS. 16A and 16B.

In the operation of FIGS. 16A and 16B, operation of advancing the driving electrode DE of the width of five display lines shown in FIG. 16B by a distance of two display lines when the display line advances by a one-line distance is carried out.

If shift operation with standby is applied to this operation, then, for example, while the display line advances by two lines, the driving electrode DE is not shifted, but when the display line advances to the third line, the driving electrode DE is shifted by a distance of four pixel lines. In short, in the shift of the driving electrode DE of FIGS. 16A and 16B, shift operation is carried out skipping once per twice, and instead, after the standby, shift operation is carried out by a shift amount equal to twice that in the FIGS. 16A and 16B, that is, by a distance of four display lines, after the standby.

Such shift operation with standby as described above can be carried out similarly also to the operation of FIGS. 17A and 17B. If this operation is generalized, then the shift operation with standby can be regarded as operation of carrying out skipping shift operation at a ratio of T times to S times where S is equal to or greater than 2, that is, S≥2, and T is smaller than S, that is, T<S.

However, the skipping operation described above is a mere example of shift operation in which a standby period is provided. At least only it is necessary that the pixel line group for detection driving, that is, the range of the driving electrode DE, is two lines or more and besides a standby period within which the driving electrode DE is not shifted exists within a period within which the display line advances.

Now, two examples of a more particular configuration of the scanning driving section 9 for the application of the detection driving voltage COM which involves the shift operation described hereinabove are described.

First Example of the Configuration of the Scanning Driving Section

Figure 18:
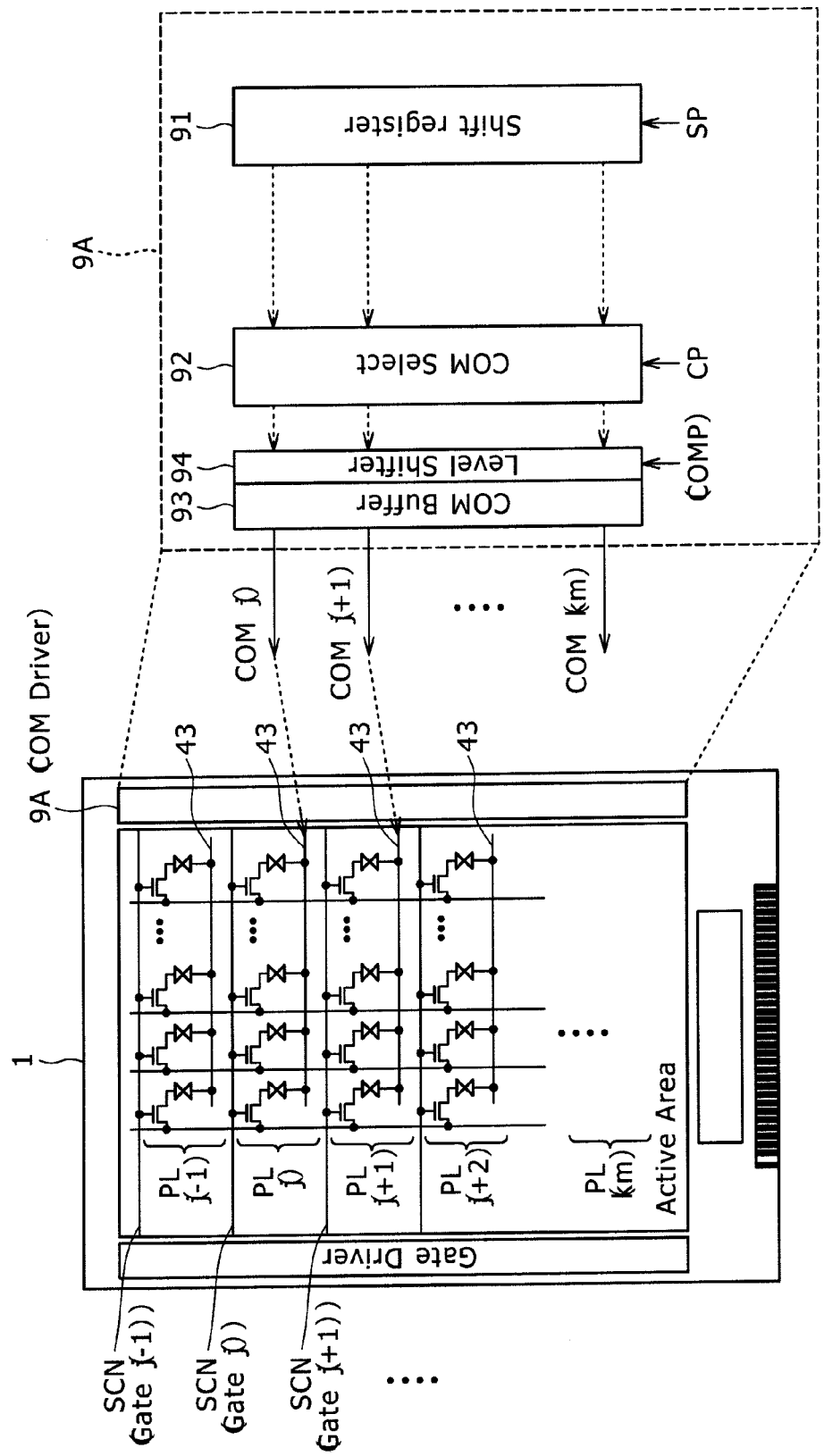
FIG. 18 is a schematic block diagram of the display apparatus showing a first example of a configuration of a scanning driving section.

FIG. 18 is a schematic block diagram of the liquid crystal display apparatus 1 which detail displays a first example of a configuration of the scanning driving section.

In the liquid crystal display apparatus 1 shown in FIG. 18, a scanning driving section 9A which corresponds to the scanning driving section 9 of FIGS. 4A and 4B is disposed remotely from a gate driver with respect to the pixel array of the display section. The gate driver is a pulse generation circuit for a gate signal (Gate(j−1), Gate(j+1), . . . ) to be applied to the scanning line SCN and serves as a vertical driving circuit.

While FIG. 18 shows four display pixel lines PL in the pixel array, the entire pixel array includes km display pixel lines PL.

Referring to FIG. 18, the scanning driving section 9A includes a shift register 91, a COM selection circuit (COM Select) 92, a COM buffer 93 and a level shifter 94.

The shift register 91 receives a start pulse SP as an input thereto, transfers and retains the start pulse SP in synchronism with a clock. Then, the shift register 91 outputs km mutually synchronized output pulses in parallel therefrom. If the start pulse SP is inputted by a plural number of times within a display period of one screen, then transfer can be repeated every time.

The COM selection circuit 92 is a selection circuit for selecting whether or not a detection driving voltage, in this instance, a COM potential, is to be outputted to each of the km driving electrodes 43. The COM selection circuit 92 receives a control pulse CP as an input thereto and passes a pulse from the shift register 91 only to a driving electrode 43 having a y address indicated by the control pulse CP. Further, the COM selection circuit 92 functions as a masking circuit for inhibiting passage of the pulse from the shift register 91 to the other driving electrodes 43. The information of whether such pulse passage should be permitted or inhibited is provided to the COM selection circuit 92 through the control pulse CP generated in accordance with an algorithm for a predetermined shift operation.

Accordingly, where a driving electrode DE is formed from five certain driving electrodes 43, the pulse passage is permitted only to five y addresses corresponding to the driving electrode DE of the five successive driving electrodes 43 but is inhibited for the other y addresses.

Further, where jump shift operation is carried out, pulse passage is permitted for five y addresses spaced, for example, by a distance of several ten to several hundred addresses and is inhibited for the five y addresses for which the pulse passage has been permitted till then.

Further, where a halting period is provided, pulse passage is additionally inhibited within the period or at y addresses corresponding to the particular region. Since the number of times of scanning for a display screen increases particularly in such continual jump shift operation like the seventh and eighth examples of shift operation, within the fly-back period or within a fixed period after the fly-back period, operation of the driving circuits may be substantially stopped by such additional inhibition of pulse passage. The period within which substantial driving control is stopped within a fixed period of time after the fly-back is determined, for example, taking the stability of the driving circuits into consideration.

Since the touch detection section 8 is operative within this halting period, noise detection described hereinabove can be carried out making use of the halting period.

The level shifter 94 changes the potential of pulses sent thereto as a result of passage permission by the COM selection circuit 92 so as to have a voltage level sufficient for control.

The detection driving voltage COM generated in this manner is inputted to the effective screen region through a final output buffer, that is, the COM buffer 93, or a final switch and is applied to a corresponding driving electrode 43.

It is to be noted that a level control signal COMP of a COM pulse is inputted to the level shifter 94 such that the potential of the COM pulse can be varied, for example, between regions in response to the level control signal. Further, the phase of the COM pulse outputted from the COM buffer 93 may be varied, for example, between regions.

The intention that the amplitude or the phase of the COM pulse is varied between regions in this manner resides in that it is taken into consideration that it is difficult for the touch detection section 8 (refer to FIGS. 6A to 6D) to carry out identification between regions only from the timing of sensor line outputting due to wiring line delay. In particular, if the amplitude or the phase of the COM pulse is varied between regions to vary the manner of driving between regions, then also it can sometimes be identified readily in which region the sensor line output is generated. By varying the amplitude or the phase of the COM pulse in this manner, it is intended to raise the accuracy in touch detection to assist this.

It is to be noted that, where the sequential shift operation is combined with the jump shift operation, a shift register for shift operation may be provided in front of the level shifter 94.

The configuration shown in FIG. 18 may be replaced by a different circuit configuration wherein transfer logics independent of each other are used to control a plurality of driving electrodes 43 for individual regions. However, this gives rise to a disadvantage that the control circuit scale becomes large and, in actual use, a peripheral section, that is, a picture frame, of the effective display region of the liquid crystal display apparatus 1 becomes large and the power consumption increases.

Therefore, with the configuration shown in FIG. 18, there is an advantage that, also where the transfer logic controls the driving electrodes 43 for the individual regions, the single scanning driving section 9A can be used for driving, and the increase of the picture frame can be suppressed to the minimum and also the power consumption can be suppressed to the utmost.

It is to be noted that, since, in such continual jump shift operation as in the seventh and eighth examples of shift operation described hereinabove, since the scanning is one-directional scanning suitable for a driving circuit configured on the basis of such a shift register as described above, the configuration for output control of a pulse can be omitted or simplified significantly.

On the other hand, in operation which includes jump shift between regions as in the first and sixth examples of shift operation, since first detection of a detection object is carried out early, the operation is advantageous for improvement of the latency.

In order to improve the latency by continual jump shift operation, the value of K which is the line converted ratio of the relative speed should be increased.

In this manner, improvement of the latency and suppression of increase of the circuit burden have a tradeoff relationship, and which one of the shift operations described above should be selected is determined depending upon which one of the improvement of the latency and the suppression of increase of the circuit burden should be prior. The latency can be improved also by improvement of the driving frequency or the processing speed of the image processing circuit. Further, although it depends upon application software or an application to be used, if it is taken into consideration that only it is necessary for a latency higher than a certain fixed level to be obtained, it is preferable to use the continual jump shift operation with which somewhat high practical latency is obtained and which is advantageous in suppression of the circuit burden and the cost.

Second Example of the Configuration of the Scanning Driving Section

Figure 19:
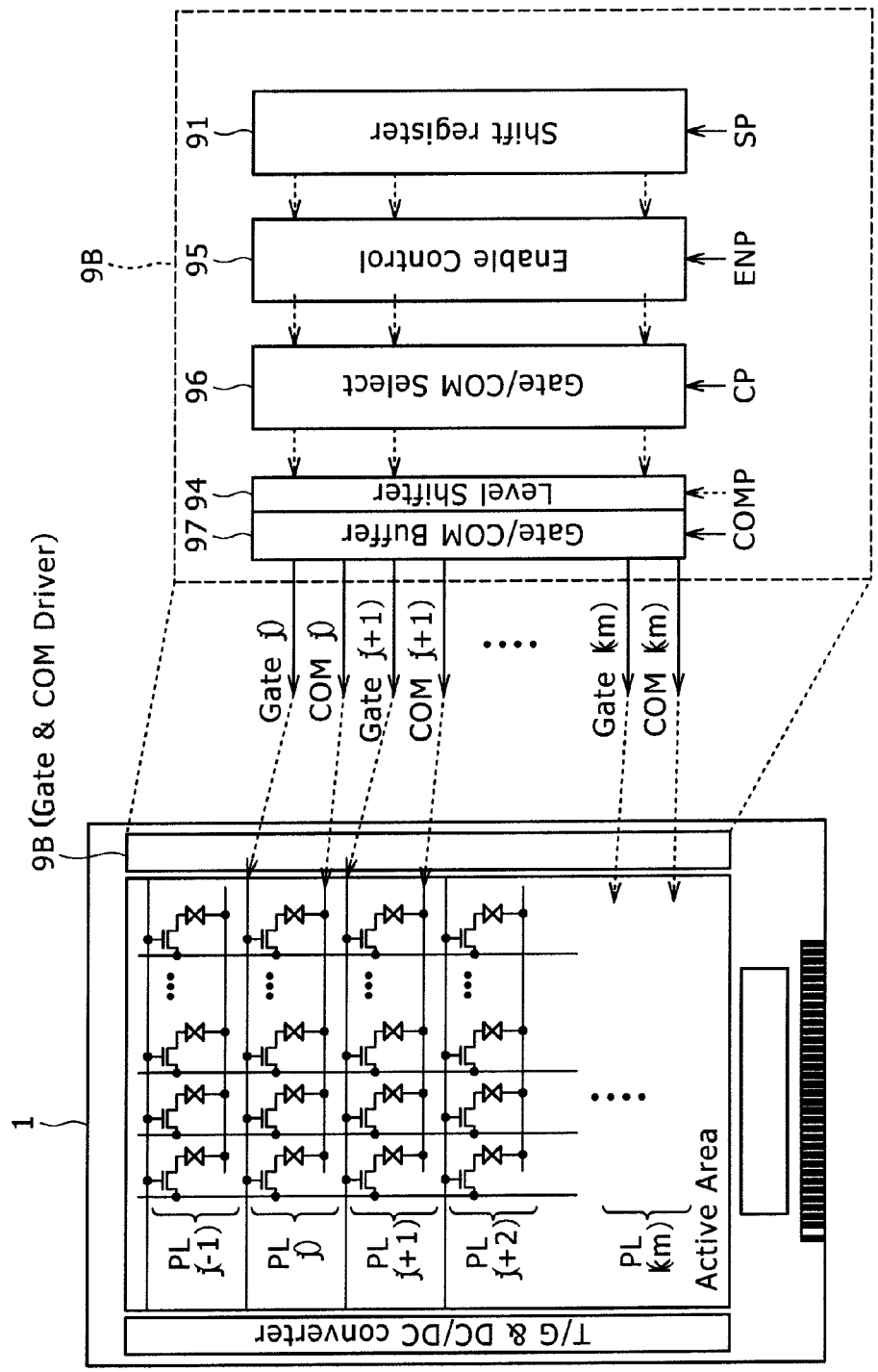
FIG. 19 is a schematic block diagram of the display apparatus showing a second example of a configuration of a scanning driving section.

FIG. 19 is a schematic block diagram of a liquid crystal display apparatus 1 which shows details of a second example of a configuration of the scanning driving section.

In the configuration shown in FIG. 19, a function of a gate driver provided separately in the configuration shown in FIG. 18 is provided in the scanning driving section 9B.

For example, such a case that the arrangement region for a gate driver becomes insufficient as a result of assurance of an arrangement region for a timing generation circuit (T/G) or a DC-DC converter as seen in FIG. 19 may occur.

In this instance, although it is possible to use transfer logics independent of each other, this increases the control circuit scale, and in practical use, such a disadvantage that the picture frame becomes large and the power consumption increases is invited. Thus, in FIG. 19, a function of a gate driver is provided in the scanning driving section 9B.

One of differences of the scanning driving section 9B shown in FIG. 19 from the scanning driving section 9A shown in FIG. 18 is that a permission control circuit (Enable Control) 95 is disposed on the output side of the shift register 91. Further, in FIG. 19, a gate/COM selection circuit (Gate/COM Select) 96 is provided in place of the COM selection circuit 92 of FIG. 18. Furthermore, in FIG. 19, a gate/COM buffer 97 is provided in place of the COM buffer 93 of FIG. 18.

The permission control circuit 95 permits pulse passage of a pulse from the shift register 91 similarly as in the permission control circuit 95 of FIG. 18 and adds, to the pulse whose passage is permitted, information for identifying a y address corresponding to a display pixel line PL from which a gate pulse to be applied to a scanning line SCN is to be generated. For example, where a certain pulse from among a plurality of pulses whose passage is permitted corresponds to a display pixel line, the permission control circuit 95 inverts and passes only the pulse therethrough.

The gate/COM selection circuit 96 permits passage only of a pulse of a y address corresponding to a driving electrode 43 to be controlled for detection driving from a control pulse CP inputted thereto, and, if the input pulse at this time is in an inverted state, the gate/COM selection circuit 96 permits also the inverted pulse therethrough.

The level shifter 94 changes the level only of a COM pulse for detection driving similarly as in the case of FIG. 18.

The gate/COM buffer 97 distributes only an inverted pulse to an output path for a gate signal (Gate) so as to be inverted and then applies the pulse to a scanning line SCN for the display pixel lines PL. Further, since the non-inverted pulse is the COM pulse whose level is adjusted, it is distributed and outputted to the output path of the driving electrode 43.

It is to be noted that the manner of adding information for identification of a y address corresponding to a display pixel line PL is not limited to the pulse inversion but may be some other method. Further, the permission control circuit 95 and the gate/COM selection circuit 96 may be configured otherwise such that each of them receives a pulse train as an input thereto from the shift register 91 and selects and outputs a pulse corresponding to the y address to be outputted. Or, they may have a register configuration of two systems.

In the first and second embodiments described above, it is possible to improve the detection speed without raising the detection driving frequency and detect a touch (or proximity) position without a complicated sensor line structure or without increase of the number of detectors.

Since, at a certain moment, a potential variation for touch detection which appears at a sensor line output corresponds to touch or proximity at one place, position detection is easy. Further, even if a plurality of detection objects exist, it can be identified with which region each detection object touches or is proximate. At this time, since the TFT 23 (refer to FIG. 7) is in an off state, even if the potential at the driving electrodes other than that for the writing line fluctuates, this does not have an influence on image display.

<3. Modifications>

At the top of the description of the embodiments of the present invention, it is described that the present invention can be applied not only to a capacitance type apparatus but also to a resistance film type apparatus and an optical type apparatus.

Where the present invention is applied to a resistance film type apparatus, the scanning driving section 9 of FIGS. 4A and 4B may be a circuit for AC driving similarly as in the foregoing description or may be a circuit for DC driving by application of a DC voltage. Whichever driving method is adopted for the scanning driving section 9, if a detection object such as a finger or a stylus pen touches the detection face, then an electric characteristic such as a voltage of the driving electrodes DE at the touching position is transmitted to a sensor line SL through a sensor switch not shown. Though not particularly shown, such sensor switches are disposed substantially in a matrix on an arrangement face parallel to the detection face. The sensor switches are pressure switches which are individually disposed at crossing points between the driving electrodes DE and the sensor lines SL and short-circuit them only when pressing force by touching is applied but cancel the short-circuiting when the pressing force is removed.

If the sensor switch is switched on at least at one of the crossing points of the driving electrodes DE and the sensor lines SL, then an electric variation occurs with the corresponding sensor line SL at a certain point of time which corresponds to a detection position coordinate in the y direction. The touch detection section 8 can detect the touched position of the detection face from the sensor line SL with which the electric variation occurs, that is, the detection position coordinate in the x direction, and the time of occurrence of the electric variation, that is, the detection position coordinate in the y direction.

Where the present invention is applied to an optical type apparatus, though not particularly shown, the scanning driving section 9 of FIG. 4A controls, for example, a detection driving voltage for controlling a transistor which reads out accumulated charge of a photodiode in the light reception circuit. In other words, the scanning driving section 9 in this instance is a DC-driven scanning circuit by DC voltage application.

Light from a light source not shown is emitted externally from the detection face and is reflected by a detection object and returned to the detection face. The reflected light enters the touch detection apparatus through the detection face and is received by a photodiode or photodiodes. A large number of such photodiodes are formed, for example, in a matrix on an arrangement plane parallel to the detection face. Therefore, by several photodiodes corresponding to the position of detection object, charge accumulation is carried out by reception of the reflected light. The scanning driving section 9 repeats operation of applying a detection driving voltage and shift operation, and by application of the detection driving voltage, output permission of the photodiode of the light reception circuit is issued and an electric variation occurs with the sensor lines SL. Consequently, an electric variation of the sensor lines SL occurs at a certain point of time which corresponds to the detection position coordinate in the y direction. The touch detection section 8 can detect the touched position in the detection face from the sensor lines SL with which an electric variation occurs, that is, the coordinates of the detection positions in the x direction, and the time of occurrence, that is, the detection position coordinates in the y direction.

From the foregoing, the present invention can be applied widely to a touch detection apparatus which outputs detection signals using the sensor lines SL in the form of parallel stripes arranged long in a certain fixed direction and a display apparatus having a function for the touch detection. This system can be applied irrespective of the detection type such as, the capacitance type, resistance film type or optical type. In touch detection of this system, by scanning detection driving voltages in a direction different from the arrangement direction of the sensor lines SL, an x coordinate and a y coordinate of a detection position can be specified from an address of a sensor line and time information on and at which an output is obtained.

Also in the resistance film type apparatus and the optical type apparatus described above, similarly as in the capacitance type apparatus described hereinabove, since the scanning driving section 9 carries out scanning in accordance with a predetermined algorithm including jump shift operation, the advantage that presence or absence of a detection object can be decided at an earlier stage than that in the alternative case of sequential scanning. As a result, the latency can be improved without raising the detection driving frequency.

<4. Applications to Electronic Apparatus>

Now, applications of the display apparatus described hereinabove in connection with the second embodiment and the modifications described above are described with reference to FIGS. 20A and 20B to 23A and 23B. The display apparatus according to the second embodiment and the modifications described hereinabove can be applied to electronic apparatus in various fields such as a television apparatus, a digital camera, a notebook type personal computer, a portable terminal apparatus such as a portable telephone set and a video camera. In other words, the apparatus according to the second embodiment and the modifications described above can be applied to electronic apparatus in various fields wherein an image signal inputted from the outside or an image signal generated in the inside is displayed as an image. Here, principal electronic apparatus are described.

Figure 20A:
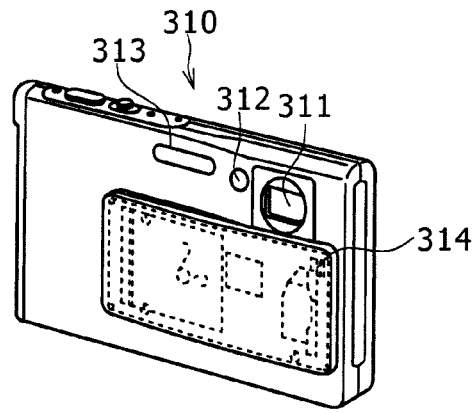
FIGS. 20A and 20B are perspective views showing a digital still camera including the liquid crystal display apparatus to which an embodiment of the present invention is applied.
Figure 20B:
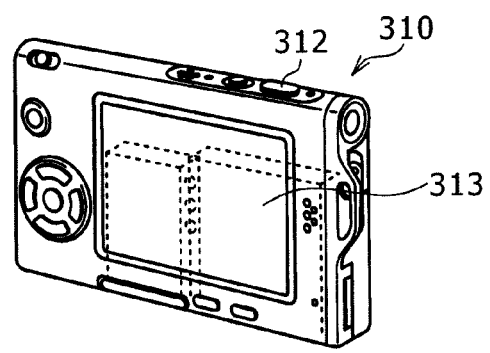

FIGS. 20A and 20B show a digital camera to which the present invention is applied, and particularly FIG. 20A is a front elevational view and FIG. 20B is a rear elevational view.

Referring to FIGS. 20A and 20B, the digital camera 310 shown includes an image pickup lens in a protective cover 314, a flash light emitting section 311, a display section 313, a control switch, a menu switch, a shutter 312 and so forth. The digital camera 310 is produced using the display apparatus having the touch sensor function described hereinabove in connection with the second embodiment and the modifications as the display section 313.

Figure 21:
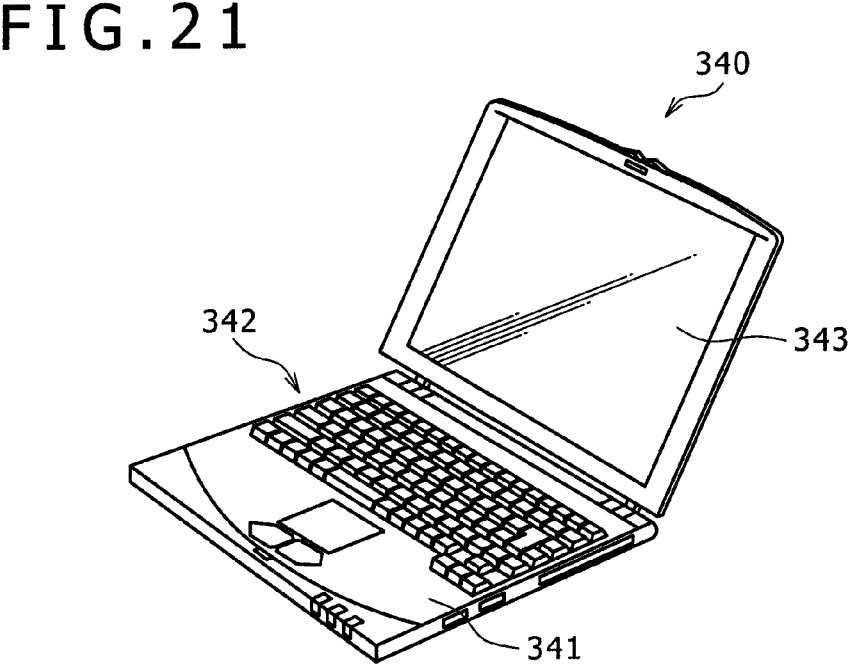
FIG. 21 is perspective view showing a notebook type personal computer including the liquid crystal display apparatus to which an embodiment of the present invention is applied.

FIG. 21 shows a notebook type personal computer to which an embodiment of the present invention is applied.

Referring to FIG. 21, the notebook type personal computer 340 shown includes a keyboard 342 provided on a body 341 for being operated to input characters and so forth, a display section 343 provided on a body cover for displaying an image. The notebook type personal computer 340 is produced using the display apparatus having the touch sensor function described hereinabove in connection with the second embodiment and the modifications as the display section 343.

Figure 22:
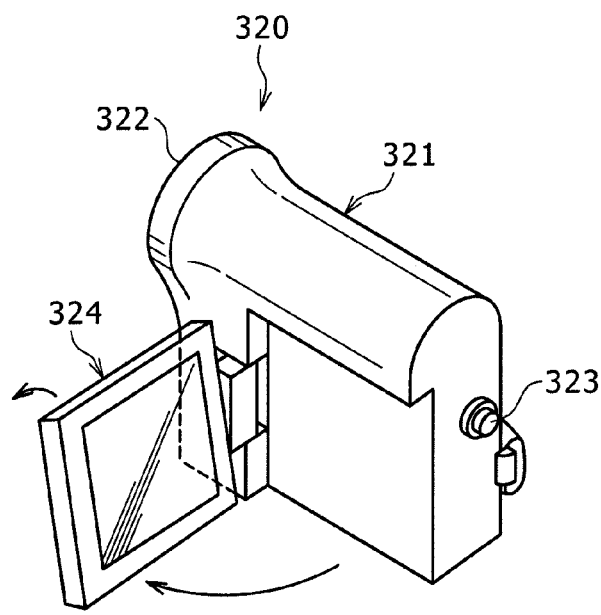
FIG. 22 is a perspective view showing a video camera including the liquid crystal display apparatus to which an embodiment of the present invention is applied.

FIG. 22 shows a video camera to which an embodiment of the present invention is applied.

Referring to FIG. 22, the video camera 320 shown includes a body section 321, and a lens 322 for picking up an image of an image pickup object, a start/stop switch 323 for image pickup, a monitor 324 and so forth provided on a face of the body section 321 which is directed forwardly. The video camera 320 is produced using the display apparatus having the touch sensor function described hereinabove in connection with the second embodiment and the modifications as the monitor 324.

Figure 23A:
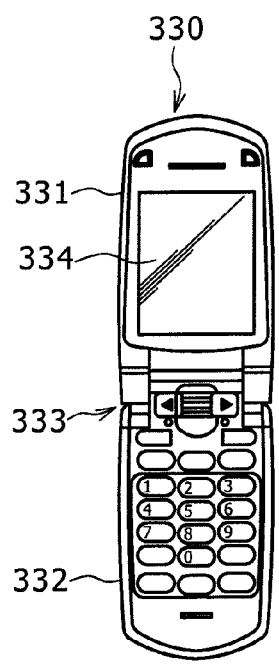
FIGS. 23A and 23B are front elevational views showing a portable terminal apparatus including the liquid crystal display apparatus to which an embodiment of the present invention is applied in an open state and a closed state, respectively.
Figure 23B:
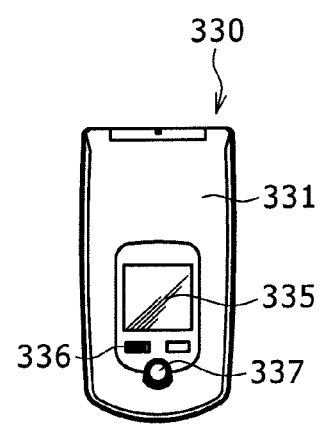

FIGS. 23A and 23B show a portable terminal apparatus to which an embodiment of the present invention is applied, and particularly FIG. 23A shows the portable terminal apparatus in an open state and FIG. 23B shows the portable terminal apparatus in a closed state.

Referring to FIGS. 23A and 23B, the portable terminal apparatus 330 includes an upper side housing 331, a lower side housing 332, a connection section 333 in the form of a hinge section, a display section 334, a sub display section 335, a picture light 336, a camera 337 and so forth. The portable terminal apparatus 330 is produced using the display apparatus with the touch sensor described hereinabove in connection with the second embodiment and the modifications as the display section 334 or the sub display section 335.

It is to be noted that also it is possible to build the touch detection apparatus according to the first embodiment which has no display function in various electronic apparatus similarly to the applications described hereinabove.

In summary, according the embodiments of the present invention, modifications of the embodiments and applications of the embodiments and the modifications, a touch detection apparatus, a display apparatus and an electronic apparatus which are improved in latency upon operation by touch can be provided.

The present application contains subject matter related to that disclosed in Japanese Priority Patent Application JP 2009-120614 filed in the Japan Patent Office on May 19, 2009, and Japanese Priority Patent Application JP 2010-063024 filed in the Japan Patent Office on Mar. 18, 2010, the entire contents of which are hereby incorporated by reference.

While preferred embodiments of the present invention have been described using specific terms, such description is for illustrative purposes only, and it is to be understood that changes and variations may be made without departing from the spirit or scope of the following claims.

What is claimed is:

1. A display apparatus, comprising:
a display face;
a display function layer adapted to display image data on the display face in response to an input image signal;
a plurality of driving electrodes disposed separately in one direction;
a detection scanning control section configured to apply a detection driving voltage simultaneously to some of the plurality of driving electrodes and carry out detection scanning while shifting application of the detection driving voltage in the one direction and control the detection scanning such that jump shifts are performed at a pitch of two times or more of an arrangement pitch of the driving electrodes;
a plurality of sensor lines disposed separately in a direction different from the one direction and responding to touch or proximity of a detection object with or to the display face to exhibit an electric variation, wherein
in the jump shifts, the detection scanning control section applies the detection driving voltage to some of the plurality of driving electrodes, and
a shift amount between successive jump shifts performed by the detection scanning control section is greater than the arrangement pitch of the plurality of driving electrodes; and
further wherein a region defined by a group composed of the some of the plurality of driving electrodes to which the detection driving voltage is applied includes a plurality of sensor lines and a plurality of driving electrodes so that detection scanning is completed in a fraction of time required for display scanning.

2. The display apparatus according to claim 1, wherein the detection driving scanning by the detection scanning control section and the display driving scanning by the display scanning control section are carried out in synchronism with each other for the plurality of driving electrodes.

3. The display apparatus according to claim 1, further comprising
a display scanning control section configured to control display driving scanning, wherein
the detection scanning control section carries out, within a period of the display driving scanning for N screens by the display scanning control section, the detection driving scanning for N+1 pictures or more.

4. The display apparatus according to claim 3, further comprising
a plurality of separated pixel electrodes and adapted to apply a display voltage to the display function layer for each pixel when the image signal is supplied, wherein
the plurality of driving electrodes function also as a plurality of display driving electrodes which are disposed in a pitch equal to a natural number of times a pixel pitch defined by the display function layer and to which a display driving voltage for applying a reference to the display voltage upon display variation by the display function layer successively in the one direction from the display scanning control section.

5. The display apparatus according to claim 4, wherein the detection scanning control section carries out application of the detection driving voltage at the same time to m ones of the driving electrodes, m being equal to or greater than two.

6. The display apparatus according to claim 5, wherein:
the plurality of sensor lines are disposed on the display face side of the display function layer;
the plurality of driving electrodes are disposed on the side opposite to that of the display face of the display function layer; and
the plurality of pixel electrodes are disposed between the display function layer and the plurality of driving electrodes.

7. The display apparatus according to claim 6, wherein the display function layer is a liquid crystal layer.

8. The display apparatus according to claim 7, wherein the detection scanning control section functions also as the display scanning control section configured to supply and control the display driving voltage.

9. The display apparatus according to claim 1, wherein the detection scanning control section carries out application of the detection driving voltage at the same time to m ones of the driving electrodes, m being equal to or greater than two.

10. The display apparatus according to claim 1, wherein the plurality of sensor lines are disposed on the display face side of the display function layer;
the plurality of driving electrodes are disposed on the side opposite to that of the display face of the display function layer, and
a plurality of pixel electrodes corresponding to each pixel and apply a display voltage for which a potential of a corresponding driving electrode is used as a reference to the display function layer for each pixel when the image signal is supplied are disposed between said the display function layer and the plurality of driving electrodes.

11. The display apparatus according to claim 1, wherein the display function layer is a liquid crystal layer.

12. The display apparatus according to claim 1, wherein the detection scanning control section controls the detection driving scanning such that the application object of the detection driving voltage is changed in order in the one direction among the plurality of driving electrodes disposed separately in the one direction.

13. The display apparatus according to claim 1, wherein, where a period from a current shift to a next shift is determined as one cycle, the detection scanning control section periodically executes and controls driving halting of one or more cycles in which application of the detection driving voltage is not carried out.

14. The display apparatus according to claim 13, further comprising
a touch detection section configured to generate a detection signal from the electrical variation appearing on the sensor lines, wherein
the touch detection section includes a noise removing section configured to detect, within a period of the driving halting, a noise level from the potential level of the sensor lines on which the electrical variation from which the detection signal is generated is not superposed and carrying out noise removal.

15. The display apparatus according to claim 1, wherein, where the shift operation is carried out by P times the driving electrode pitch, P being equal to or greater than 1, the detection scanning control section randomly controls the value of P.

16. The display apparatus according to claim 1, wherein each of the sensor lines is coupled to each of the driving electrodes through a capacitance, and
a peak value of a potential variation which appears, when the detection driving voltage is applied to any of the driving electrodes, with one of the sensor lines which corresponds to the driving electrode differs between one or more ones of the sensor lines which correspond to contact or proximity of the detection object and the other sensor lines.

17. A touch detection apparatus, comprising:
a detection face;
a plurality of driving electrodes disposed separately in one direction;
a detection scanning control section configured to apply a detection driving voltage simultaneously to some of the plurality of driving electrodes and carry out detection driving scanning while shifting application of the detection driving voltage in the one direction and control the detection driving scanning such that jump shifts are performed at a pitch of two times or more of an arrangement pitch of the driving electrodes; and
a plurality of sensor lines disposed separately in a direction different from the one direction and adapted to exhibit, if a detection object is brought into touch with or proximity to the detection face while the detection driving scanning is being carried out by the detection scanning control section, electric variation in response to the touch or the proximity, wherein
in the jump shifts, the detection scanning control section applies the detection driving voltage to some of the plurality of driving electrodes, and
a shift amount between successive jump shifts performed by the detection scanning control section is greater than the arrangement pitch of the plurality of driving electrodes; and
further wherein a region defined by a group composed of the some of the plurality of driving electrodes to which the detection driving voltage is applied includes a plurality of sensor lines and a plurality of driving electrodes so that detection scanning is completed in a fraction of time required for display scanning.

* * * * *